US008347347B2

(12) United States Patent
Feng et al.

(10) Patent No.: US 8,347,347 B2
(45) Date of Patent: Jan. 1, 2013

(54) PASSWORD POLICY ENFORCEMENT IN A DISTRIBUTED DIRECTORY WHEN POLICY INFORMATION IS DISTRIBUTED

(75) Inventors: Daw Feng, Austin, TX (US); Kristin Marie Hazlewood, Austin, TX (US); Gary Dale Williams, Driftwood, TX (US)

(73) Assignee: International Business Machines Corporation, Armonk, NY (US)

(*) Notice: Subject to any disclaimer, the term of this patent is extended or adjusted under 35 U.S.C. 154(b) by 971 days.

(21) Appl. No.: 11/971,510

(22) Filed: Jan. 9, 2008

(65) Prior Publication Data

US 2009/0178106 A1 Jul. 9, 2009

(51) Int. Cl.
*H04L 29/06* (2006.01)
*G06F 17/00* (2006.01)

(52) U.S. Cl. .......................... 726/1; 713/182
(58) Field of Classification Search .............. 726/1, 5–6, 726/8; 713/182–183, 176; 709/223, 225, 709/206; 370/446, 352; 707/770, 752
See application file for complete search history.

(56) References Cited

U.S. PATENT DOCUMENTS

| | | | |
|---|---|---|---|
| 6,052,724 A * | 4/2000 | Willie et al. ............ | 709/223 |
| 6,202,157 B1 | 3/2001 | Brownlie et al. | |
| 6,941,465 B1 | 9/2005 | Palekar et al. | |
| 7,165,182 B2 | 1/2007 | Excoffier et al. | |
| 7,174,563 B1 | 2/2007 | Brownlie et al. | |
| 2002/0078386 A1 | 6/2002 | Bones et al. | |
| 2004/0064742 A1* | 4/2004 | Excoffier et al. ......... | 713/202 |
| 2005/0114673 A1 | 5/2005 | Raikar et al. | |
| 2006/0235850 A1 | 10/2006 | Hazelwood et al. | |
| 2008/0140618 A1* | 6/2008 | Kumar ........................ | 707/3 |

FOREIGN PATENT DOCUMENTS

JP 2006318304 A 11/2006

OTHER PUBLICATIONS

Reiner Sailer, Attestation-based Policy Enforcement for Remote Access, Year: 2004; ACM, pp. 1-10.*
Tsai et al., "Simulation Verification and Validation by Dynamic Policy Enforcement", Proceedings of the 38th Annual Simulation Symposium, IEEE 2005, pp. 1-8.
Bhargavan et al., "Secure Sessions for Web Services", ACM Transactions on Information and System Security, vol. 10, No. 2, Article 8, May 2007, pp. 1-46.
Bernaschi et al., "REMUS: A Security-Enhanced Operating System", ACM Transactions on Information and System Security, vol. 5, No. 1, Feb. 2002, pp. 36-61.
Chong et al., "Security Policies for Downgrading", CCS'04, Oct. 2004, Washington DC, ACM publication, pp. 198-209.
Hicks et al., "Trusted Declassification—High-level policy for a security-typed language", PLAS'06, Jun. 2006, Ottawa Canada, ACM publication, pp. 65-74.

* cited by examiner

*Primary Examiner* — Aravind Moorthy
*Assistant Examiner* — Monjour Rahim
(74) *Attorney, Agent, or Firm* — Yee & Associates, P.C.; Jeffrey S. LaBaw

(57) ABSTRACT

A computer implemented method, data processing system, and computer program product for password policy enforcement in a distributed directory when policy information is distributed. When a proxy server is providing a request from a client to a backend directory server, the proxy server performs a series of LDAP operations on a targeted set of backend directory servers to collect password policy information applicable to a target user. The password policy information applicable to the target user is partitioned and distributed across the plurality of backend directory servers. When the password policy information for the target user has been collected, the proxy server evaluates the collected password policy information to determine an effective password policy for the target user. The proxy server then sends the request and subsequent requests with the effective password policy to a backend directory server.

20 Claims, 14 Drawing Sheets

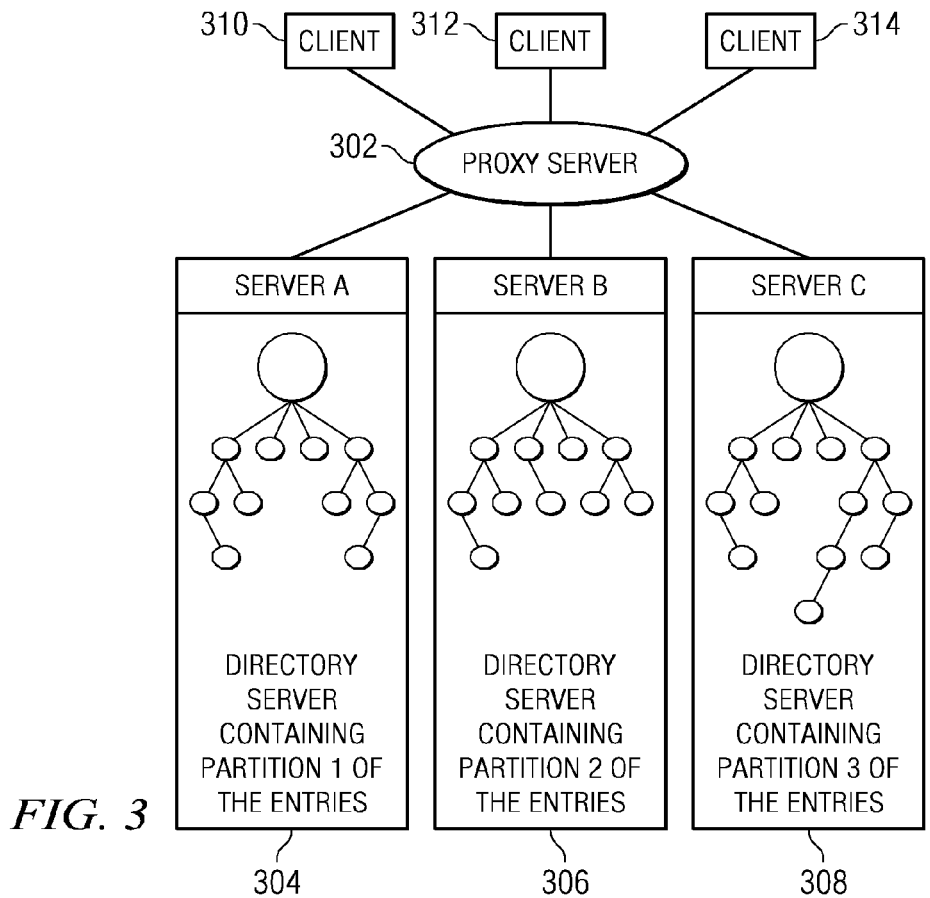

FIG. 3

| PASSWORD POLICY RULES | ORDER OF SELECTION |
|---|---|
| pwdMinLength > pwdMinOtherChars + passwordAlphaChars<br>pwdMinLength > pwdMinDiffChars | pwdMinLength,<br>passwordAlphaChars,<br>passwordMinOtherChars,<br>pwdMinDiffChars |
| pwdMaxAge > pwdMinAge<br>pwdMaxAge > pwdExpireWarning | pwdMaxAge,<br>pwdMinAge,<br>pwdExpireWarning |
| pwdAllowUserChange has to be TRUE, if<br>pwdMustChange is TRUE | pwdAllowUserChange<br>pwdMustChange |

| PWD POLICY ATTRIBUTE | MORE RESTRICTED VALUE | VALID VALUES | DEFAULT VALUE |
|---|---|---|---|
| pwdAttribute | N/A | userPassword | userPassword |
| pwdMinAge | Greater | Greater than or equal (GE) to 0 | 0 - no age limit |
| pwdMaxAge | Less | GE 0 | 0 - password does not expire |
| pwdInHistory | Greater | 0 to 10 | 0 - no password history |
| pwdCheckSyntax | Greater | 0, 1, 2<br><br>1 - if server not able to check the syntax, then accept password<br><br>2 - if server not able to check the syntax, then reject the password | 0 |
| pwdMinLength | Greater | GE 0 | 0 - no minimum length |
| pwdExpireWarning | Greater | GE 0 | 0 - no warnings will be sent |
| pwdGraceLoginLimit | Less | GE 0 | 0 - no grace login |
| pwdLockout | True | True/False | False |
| pwdLockoutDuration | Greater | GE 0 | 0 - locked out until reset |
| pwdMaxFailure | Less | GE 0 | 0 - no failure count, no lock out |
| pwdFailureCountInterval | Greater | GE 0 | 0 - no count, reset by successfully authentication |
| pwdMustChange | True | True/False | True/False if cn=noPwdPolicy |
| pwdAllowUserChange | True | True/False | True |
| pwdSafeMode | True | True/False | False |
| -pwdPolicy | True | True/False | False |
| passwordMinAlphaChars | Greater | GE 0 | 0 - no min alpha will be enforced |
| passwordMinOtherChars | Greater | GE 0 | 0 - no min other char |
| passwordMaxRepeatedChars | Less | GE 0 | 0 - no max repeated char |
| passwordMinDiffChars | Greater | GE 0 | 0 - no diff char |
| -pwdPolicyStartTime | Less | GE 0 | Entry createTimeStamp |

| GROUP X PWD POLICY | GROUP Y PWD POLICY | GROUP Z PWD POLICY | COMPOSITE GROUP PWD POLICY |
|---|---|---|---|
| pwdMaxAge=86400 pwdSafeMode=True<br><br>pwdMaxFailure=5<br>-pwdPolicy=True<br>-pwdPolicyStarttime= 20060406200000 | pwdMaxAge=43200 pwdSafeMode=False<br><br>-pwdPolicy=True<br>-pwdPolicyStarttime= 20060306200000 | pwdCheckSytax=1<br><br>-pwdPolicy=True<br>-pwdPolicyStarttime= 20060506200000 | pwdMaxAge=43200 pwdSafeMode=True pwdCheckSyntax=1 pwdMaxFailure=5<br>-pwdPolicy=True<br>-pwdPolicyStarttime= 20060306200000 |
| pwdMaxAge=86400<br>-pwdPolicy=True | pwdMaxAge=43200 pwdSafeMode=True | pwdMaxAge=0<br>-pwdPolicy=True | pwdMaxAge=86400 pwdSafeMode=False<br>-pwdPolicy=True<br>(note: group Y's pwd policy is not used in calculating composite group policy, since its -pwdPolicy is not defined and is default to FALSE.) |
| pwdMinLength=10 passwordMinOtherChars=4 passwordMinAlphaChars=6<br>-pwdPolicy=True | pwdMinLength=12<br>-pwdPolicy=True | | pwdMinLength=12<br>-pwdPolicy=True |
| pwdMinLength=10 passwordMinOtherChars=4 passwordMinAlphaChars=6<br>-pwdPolicy=True | | pwdMinLength=10 passwordMinOtherChars=5 passwordMinAlphaChars=3<br>-pwdPolicy=True | pwdMinLength=10 passwordMinOtherChars=5 passwordMinAlphaChars=3<br>-pwdPolicy=True |

| INDIVIDUAL PWD POLICY | GROUP PWD POLICY | GLOBAL PWD POLICY | EFFECTIVE PWD POLICY |
|---|---|---|---|
| pwdMaxAge=86400<br>-pwdPolicy=True<br>pwdMinAge=21600<br><br><br><br><br><br><br><br><br><br><br>pwdLockOut=True<br><br><br>-pwdPolicyStarttime=<br>20060406200000 | pwdMaxAge=43200<br>-pwdPolicy=True<br><br><br>pwdInHistory=5<br><br><br><br><br><br><br><br><br><br><br><br><br><br><br>-pwdPolicyStarttime=<br>20060306200000 | <br>-pwdPolicy=True<br><br>pwdMinAge=43200<br>pwdInHistory=3<br>pwdCheckSyntax=0<br>pwdMinLength=0<br>pwdExpireWarning=0<br>pwdGraceLoginLimit=0<br>pwdLockoutDuration=0<br>pwdMaxFailure=0<br>pwdFailureCountInterval=0<br>passwordMinAlphaChars=0<br>passwordMinOtherChars=0<br>passwordMaxRepeatedChars=0<br>passwordMinDiffChars=0<br>pwdLockout=false<br>pwdAllowUserChange=true<br>pwdMustChange=true<br>pwdSafeModify=false<br>-pwdPolicyStarttime=<br>20060506200000 | pwdMaxAge=86400<br>-pwdPolicy=True<br><br>pwdMinAge=21600<br>pwdInHistory=5<br>pwdCheckSyntax=0<br>pwdMinLength=0<br>pwdExpireWarning=0<br>pwdGraceLoginLimit=0<br>pwdLockoutDuration=0<br>pwdMaxFailure=0<br>pwdFailureCountInterval=0<br>passwordMinAlphaChars=0<br>passwordMinOtherChars=0<br>passwordMaxRepeatedChars=0<br>passwordMinDiffChars=0<br>pwdLockout=True<br>pwdAllowUserChange=true<br>pwdMustChange=true<br>pwdSafeModify=false<br>-pwdPolicyStarttime=<br>20060406200000 |
| pwdMaxAge=86400<br>-pwdPolicy=True<br>pwdMinAge=21600<br><br><br>pwdMinLength=8<br><br><br><br><br><br><br><br><br><br><br><br>pwdLockout=True<br><br><br>-pwdPolicyStarttime=<br>20060406200000 | pwdMaxAge=43200<br>-pwdPolicy=True<br><br><br>pwdInHistory=5<br><br><br><br><br><br><br><br><br><br><br><br><br><br><br>-pwdPolicyStarttime=<br>20060306200000 | <br>-pwdPolicy=True<br><br>pwdMinAge=0<br>pwdInHistory=3<br>pwdCheckSyntax=0<br>pwdMinLength=10<br>pwdExpireWarning=0<br>pwdGraceLoginLimit=0<br>pwdLockoutDuration=0<br>pwdMaxFailure=0<br>pwdFailureCountInterval=0<br>passwordMinAlphaChars=4<br>passwordMinOtherChars=4<br>passwordMaxRepeatedChars=0<br>passwordMinDiffChars=0<br>pwdLockout=false<br>pwdAllowUserChange=true<br>pwdMustChange=true<br>pwdSafeModify=false<br>-pwdPolicyStarttime=<br>20060506200000 | pwdMaxAge=86400<br>-pwdPolicy=True<br><br>pwdMinAge=21600<br>pwdInHistory=5<br>pwdCheckSyntax=0<br>pwdMinLength=8<br>pwdExpireWarning=0<br>pwdGraceLoginLimit=0<br>pwdLockoutDuration=0<br>pwdMaxFailure=0<br>pwdFailureCountInterval=0<br>passwordMinAlphaChars=0<br>passwordMinOtherChars=0<br>passwordMaxRepeatedChars=0<br>passwordMinDiffChars=0<br>pwdLockout=True<br>pwdAllowUserChange=true<br>pwdMustChange=true<br>pwdSafeModify=false<br>-pwdPolicyStarttime=<br>20060406200000 |

PASSWORD POLICY ENFORCEMENT IN A DISTRIBUTED DIRECTORY WHEN POLICY INFORMATION IS DISTRIBUTED

BACKGROUND OF THE INVENTION

1. Field of the Invention

The present invention relates generally to an improved data processing system, and in particular to password policy enforcement in a distributed directory when policy information is distributed.

2. Description of the Related Art

A directory is a special type of database for managing information about people, organizations, data processing systems, and other information sources. Information within a directory is organized within a hierarchical namespace. Each entry in the directory is a named object and consists of a set of attributes. Each attribute has a defined attribute type and one or more values. Each entry is identified by an unambiguous distinguished name (DN), wherein a distinguished name is a concatenation of selected attributes from an entry. A directory service provides a mechanism for searching a directory and for retrieving information from a directory. Various standards have been promulgated for defining directories and directory services. For example, the X.500 specifications define a directory standard; more information can be found in Weider et al., "Technical Overview of Directory Services Using the X.500 Protocol", Internet Engineering Task Force (IETF) RFC 1309, March 1992. As another example, the Lightweight Directory Access Protocol (LDAP) specifications define a protocol for accessing a directory that supports the X.500 directory model; more information can be found in Wahl et al., "Lightweight Directory Access Protocol (v3)," IETF RFC 2251, December 1997.

A logical representation of a directory does not necessarily reflect an organization of the physical storage of the directory. In a manner similar to many types of memory systems, a directory may be logically supported as a cohesive whole yet physically supported in a distributed manner. For example, a single "distributed" directory may be stored across many servers, wherein each server supports a subtree of the directory. In particular, a known distributed directory environment includes one or more LDAP "backend" servers and a proxy server that acts as an intermediate agent between a client and the distributed directory environment. Clients bind to the proxy server instead of directly binding to the backend LDAP servers.

A set of rules that controls how passwords are used and administered in this type of directory environment is known as a "password policy." These rules enforce various security requirements, e.g., that a user change his or her password periodically, that the user's selected password meets certain requirements for construction, that re-use of an old password is prevented, that entities are locked out after a certain number of failed attempts to use a given password, and so on. A "user" refers to any LDAP client application that has an identity in the directory. In an LDAP distributed directory environment, a given password policy is defined according to an object-oriented schema that defines a password policy object class, which includes a set of administrative password policy attributes, together with a set of operational attributes that hold general policy state information for each user. The policy also includes one or more "controls" that are used while enforcing password policy. In particular, a "request control" is defined as a control that is sent by a client with a request operation to elicit a "response control." The "response control" typically contains one or more warnings and errors associated with password policy. Further details of how to implement password policy in this manner is described in Behera et al., "Password Policy for LDAP Directories", Internet Draft RFC, October 2001.

SUMMARY OF THE INVENTION

The illustrative embodiments provide a computer implemented method, data processing system, and computer program product for password policy enforcement in a distributed directory when policy information is distributed. When a proxy server is providing a request from a client to a backend directory server, the proxy server performs a series of LDAP operations on a set of targeted backend directory servers to collect password policy information applicable to a target user. The password policy information applicable to the target user is partitioned and distributed across the targeted backend directory servers. When the password policy information for the target user has been collected, the proxy server evaluates the collected password policy information to determine an effective password policy for the target user. The proxy server then sends the request and any subsequent requests with the effective password policy to a backend directory server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates a distributed directory configuration in accordance with the illustrative embodiments;

FIG. 4 is a table illustrating representative password policy rules and their order of selection for evaluating a user's group password policy;

FIG. 5 is a table describing how restrictive attribute values are determined;

FIG. 6 is a table showing examples of how a user's group password policy is determined;

FIG. 7 is a table showing examples of how effective password policies are determined;

DETAILED DESCRIPTION OF THE PREFERRED EMBODIMENT

In general, the devices that may comprise or relate to the present invention include a wide variety of data processing technology. Therefore, as background, a typical organization of hardware and software components within a distributed data processing system is described prior to describing the present invention in more detail.

Figure 1A:
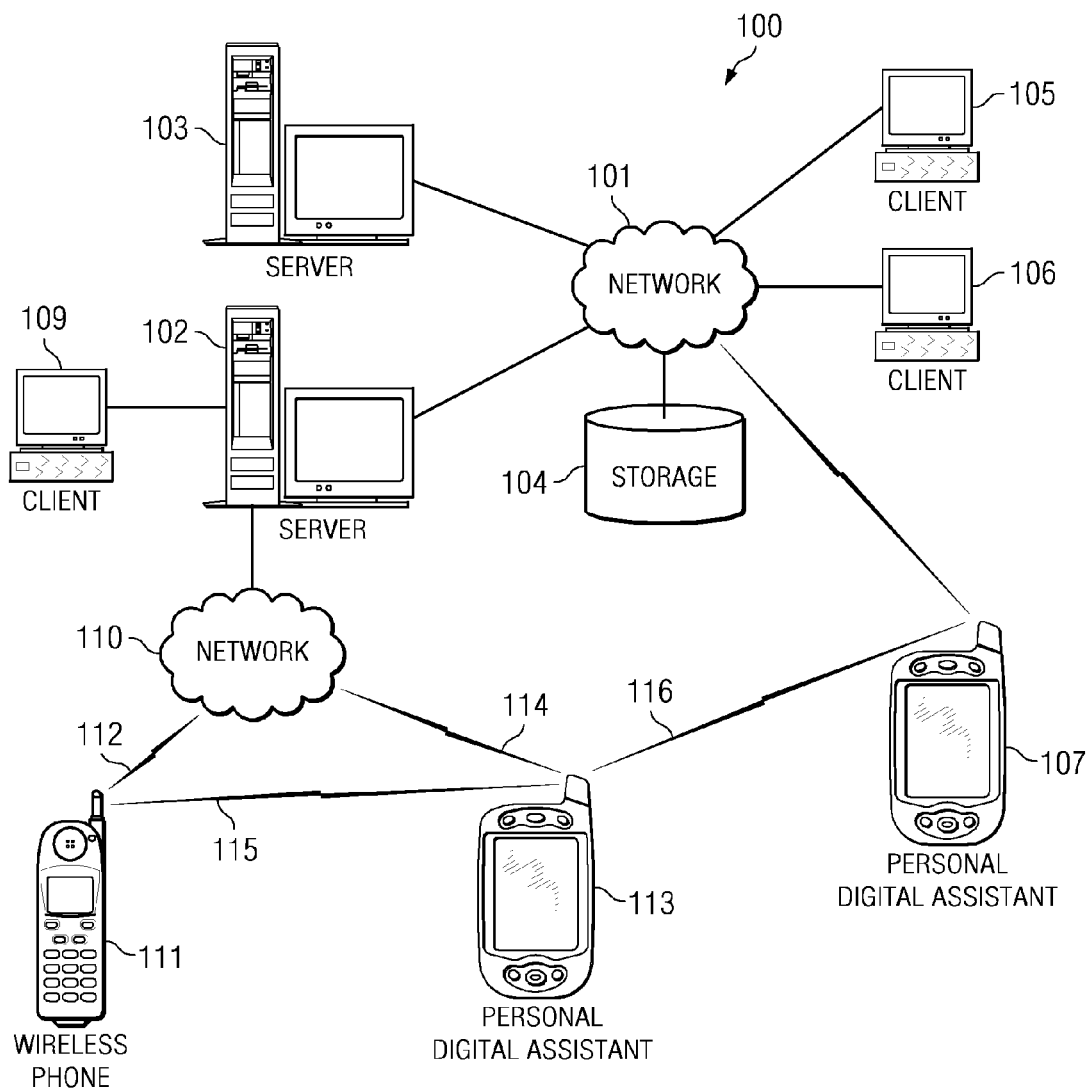
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), and the like. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), and so on. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth wireless technology, to create so-called personal area networks (PAN) or personal ad-hoc networks. In a similar manner, PDA 113 can transfer data to PDA 107 via wireless communication link 116.

The illustrative embodiments may be implemented on a variety of hardware platforms; FIG. 1A is intended as an example of a heterogeneous computing environment and not as an architectural limitation for the illustrative embodiments.

Figure 1B:
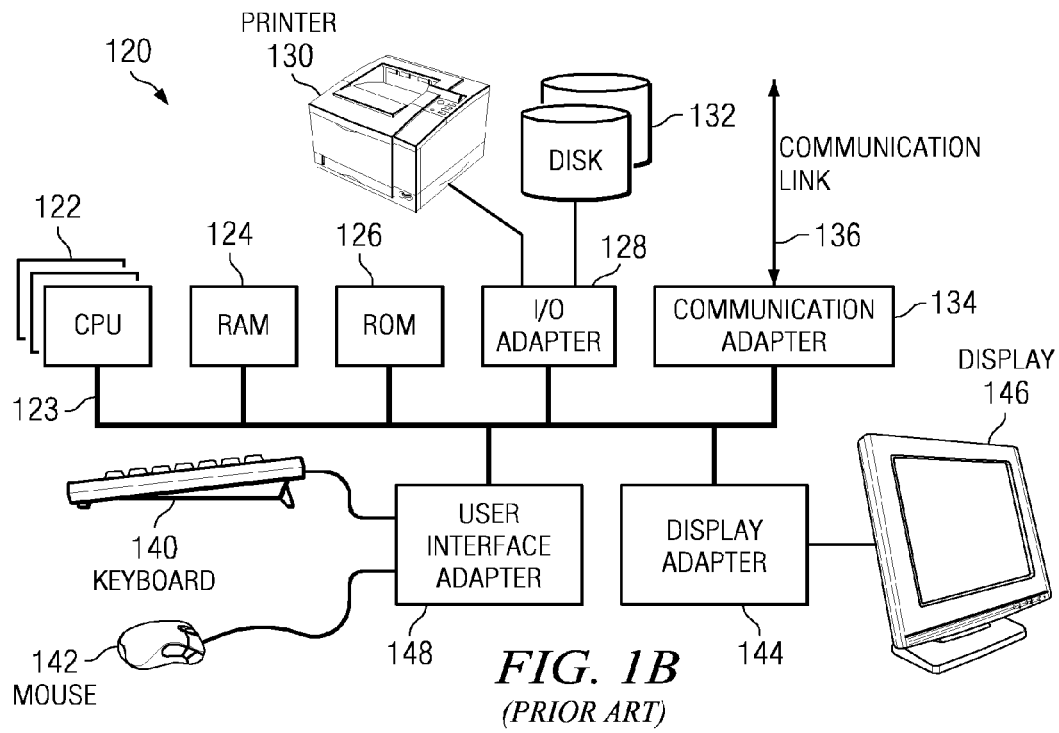
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, and the like. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the illustrative embodiments.

In addition to being able to be implemented on a variety of hardware platforms, the illustrative embodiments may be implemented in a variety of software environments. A typical operating system may be used to control program execution within each data processing system. For example, one device may run a UNIX operating system, while another device contains a simple Java runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The illustrative embodiments may be implemented on a variety of hardware and software platforms, as described above with respect to FIG. 1A and FIG. 1B. More specifically, though, the illustrative embodiments are directed to an improved distributed data processing environment. Prior to describing the illustrative embodiments in more detail, some aspects of typical distributed data processing environments are described.

The descriptions of the figures herein may involve certain actions by either a client device or a user of the client device. One of ordinary skill in the art would understand that responses and/or requests to/from the client are sometimes initiated by a user and at other times are initiated automatically by a client, often on behalf of a user of the client. Thus, when a client or a user of a client is mentioned in the description of the figures, it should be understood that the terms "client" and "user" can be used interchangeably without significantly affecting the meaning of the described processes.

Certain computational tasks may be described below as being performed by functional units. A functional unit may be represented by a routine, a subroutine, a process, a subprocess, a procedure, a function, a method, an object-oriented object, a software module, an applet, a plug-in, an Active control, a script, or some other component of firmware or software for performing a computational task.

The descriptions of the figures herein may involve an exchange of information between various components, and the exchange of information may be described as being implemented via an exchange of messages, e.g., a request message followed by a response message. It should be noted that an exchange of information between computational components, which may include a synchronous or asynchronous request/response exchange, may be implemented equivalently via a variety of data exchange mechanisms, such as messages, method calls, remote procedure calls, event signaling, or other mechanism.

The illustrative embodiments are described below with respect to terminology and functionality as associated with X.500 directories and Lightweight Directory Access Protocol (LDAP) operations, but it should be noted that the illustrative embodiments may be implemented using a variety of directory implementation schemes and protocols.

Figure 1C:
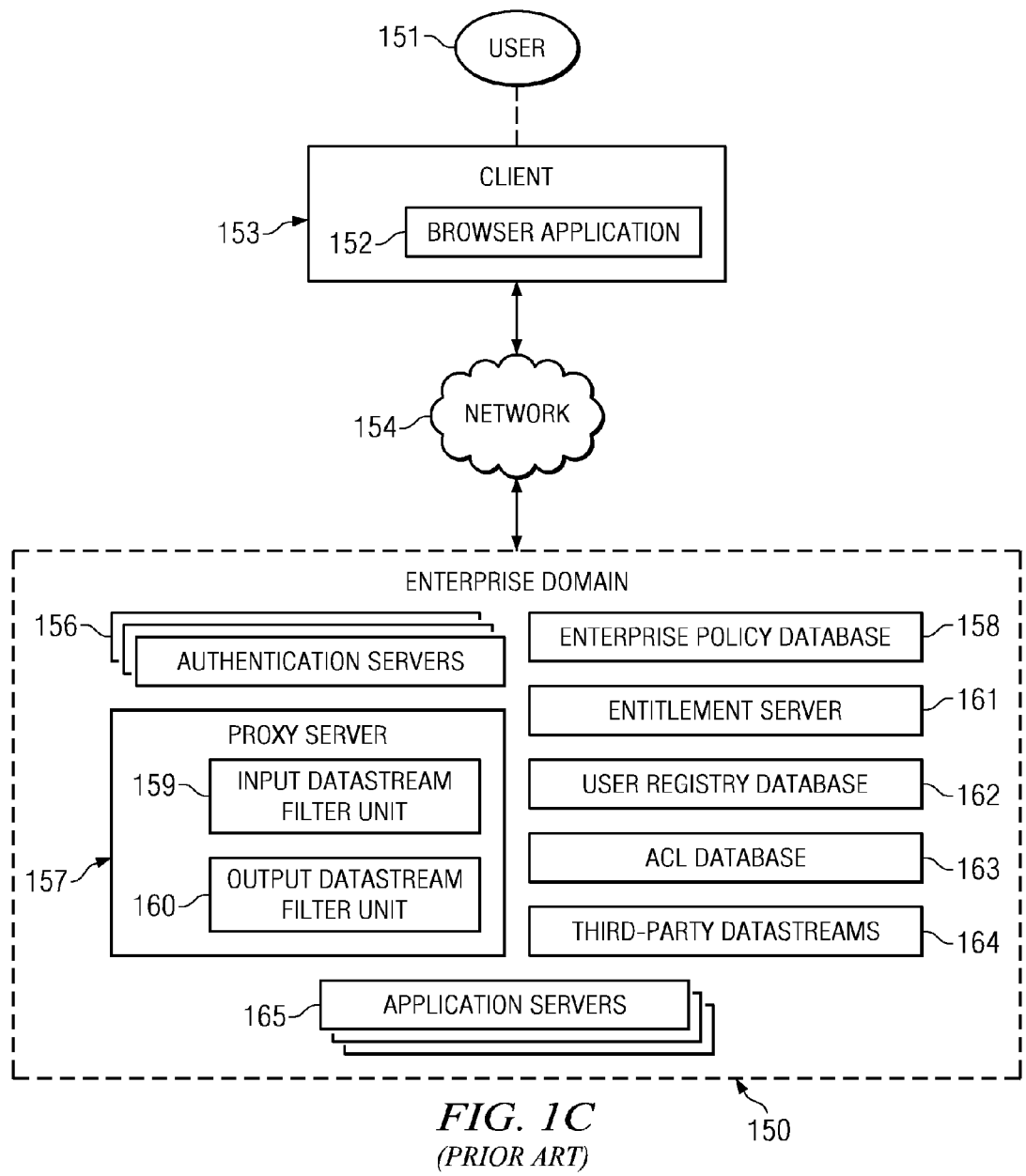
FIG. 1C depicts a block diagram that shows a typical distributed data processing system for an enterprise domain.

With reference now to FIG. 1C, a block diagram depicts a typical distributed data processing system for an enterprise domain. As in a typical corporate computing environment or an Internet-based computing environment, enterprise domain 150 hosts controlled resources that user 151 can access, e.g., by using browser application 152 on client device 153 through network 154.

Enterprise domain 150 supports multiple servers. Application servers 165 support accessible resources through web-based applications or other types of applications, including legacy applications. Authentication servers 156 support various authentication mechanisms, such as username/password, X.509 certificates, secure tokens, or an SSL session.

Proxy server 157 performs a wide range of functions for enterprise domain 150. Proxy server 157 can be administratively configured through configuration files and enterprise policy database 158 to control the functionality of proxy server 157, e.g., caching web pages in order to mirror the content from an application server or filtering the incoming and outgoing datastreams through input datastream filter unit 159 and output datastream filter unit 160. Input datastream filter unit 159 may perform multiple checks on incoming requests while output datastream filter unit 160 may perform multiple checks on outgoing responses; each check may be performed in accordance with goals and conditions that are specified within various enterprise policies.

Enterprise domain 150 comprises entitlements server 161, which accepts information within user registry database 162, access control list (ACL) database 163, and third-party datastreams 164 from other domains. Entitlements server 161 determines whether users are authorized to access certain services that are provided by application servers 165 within domain 150 by checking policies and/or access control lists against user requests for those services. A set of user-specific entitlements is used by proxy server 157, entitlement server 161, or a combined or coordinated effort between proxy server 157 and entitlement server 161 to determine or control access to application servers 165 and other controlled resources in response to user requests.

The above-noted entities within enterprise domain 150 represent typical entities within many computing environments. Web-based applications can utilize various means to prompt users to enter authentication information, often as a username/password combination within an HTML form. In the example that is shown in FIG. 1C, user 151 may be required to be authenticated before client 153 may have access to resources, after which a session is established for client 153. In FIG. 1C, after receiving an incoming request from client 153, input datastream filter unit 159 may determine whether client 153 has already established a session; if not, an authentication service on authentication servers 156 can be invoked in order to authenticate user 151. If client 153 has already established a session, then additional checks may be performed on an incoming request prior to granting access to a controlled resource; the additional checks may be specified in an enterprise authentication policy.

Figure 2:
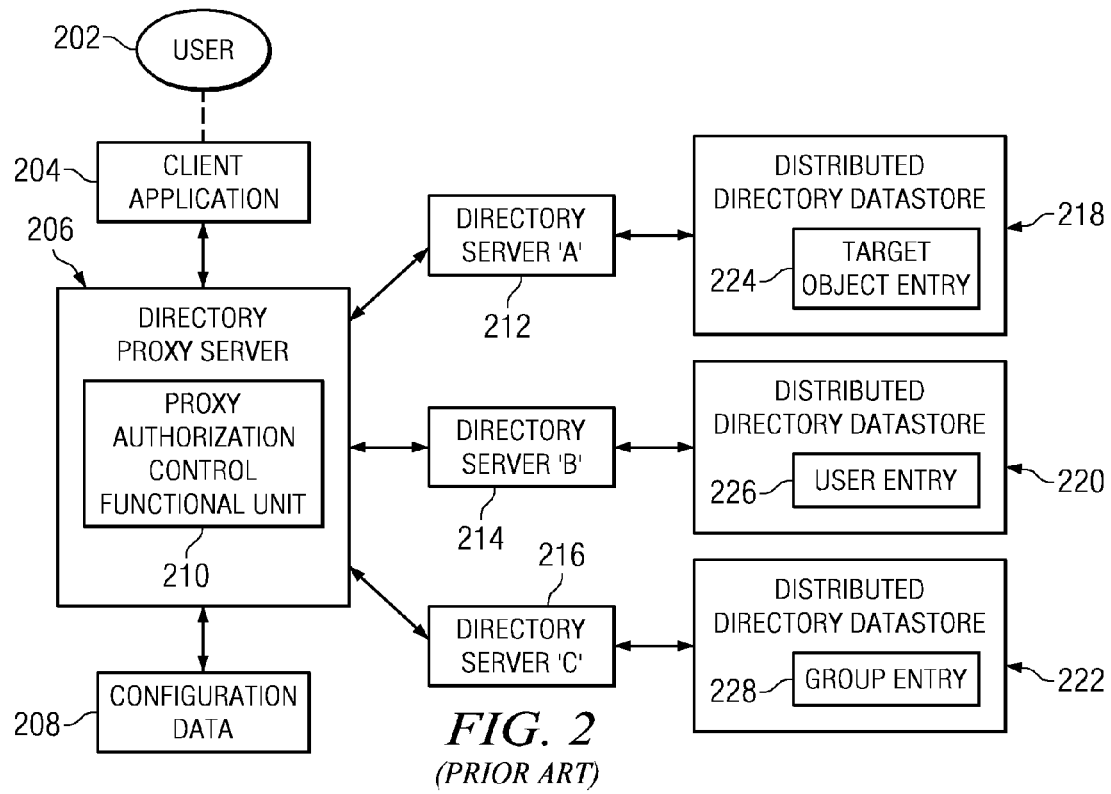
FIG. 2 depicts a block diagram that shows a typical distributed directory environment.

With reference now to FIG. 2, a block diagram depicts a typical distributed directory environment. User 202 operates client application 204, which may execute on a client device such as client 153 as shown in FIG. 1C. Client application 204 interacts with directory servers through a proxied directory server, also known as a directory proxy server or a proxy directory server, which is shown as proxy server 206; proxy server 206 may execute on the user's client device or elsewhere within a network of connected devices, such as those shown in FIG. 1A. Proxy server 206 may be associated with configuration files 208 that contain information that is managed via an administrative user application to control the functionality of proxy server 206.

Proxy server 206 acts as an intermediate agent (an "intermediary") to the distributed directory environment. Although only one proxy server is shown, there may be multiple such proxy servers or proxy server instances running on one or more physical machines. Proxy server 206 is able to perform operations in accordance with a variety of directory schemes and protocols, including LDAP specifications. Proxy server 206 contains proxy authorization control functional unit 210, which generates proxy authorization controls, also called proxied authorization controls, that are employed by proxy server 206 to perform an operation with respect to the distributed directory on behalf of client application 204, or equivalently, on behalf of user 202. As described in Wahl et al., "Lightweight Directory Access Protocol (v3)", IETF RFC 2251, December 1997, a control is a way to specify extension information for use with an LDAP operation. Controls can be sent as part of an LDAP request and apply only to the accompanying request. If the server recognizes the control type and it is appropriate for the operation, the server will make use of the control when performing the requested operation; various optional parameters can be used to inform the server whether or not to ignore the control if it is unrecognized or it is inappropriate. The control also contains an object identifier that has been assigned to the control.

Hence, proxy authorization control functional unit 210 can present an application programming interface (API) that accepts a proxy distinguished name (DN) as an input parameter; this input parameter specifies the distinguished name of the entry of the identity that proxy server 206 is to assume when performing an operation on behalf of client application 204 or user 202. The provided API can be used by the caller to create an LDAP control containing the proxy authorization identity; the created proxy authorization control would then be included in LDAP operations to request an operation from a directory server. Using the proxy authorization control mechanism, a client, or in this case, proxy server 206, can bind to the directory engine using its own identity, but is granted proxy authorization rights of another user, i.e. user 202 or client application 204, to access the target directory.

When the LDAP server receives an operation with proxy authorization control, the bind distinguished name is validated against the administrative group and/or the predefined proxy authorization group to determine whether the bind distinguished name should be granted the proxy authorization right. In other words, the bound application client, which is proxy server 206 in this example, must be a member of the administrative group or proxy authorization group to request a proxy authorization operation. More information about using a proxy authorization control can be found in Weltman, "LDAP Proxied Authorization Control," IETF Internet-Draft, draft-weltman-ldapv3-proxy-12.txt, April 2003. The LDAP protocol also supports an extension mechanism that allows additional operations to be defined for services that are not defined within the LDAP specification. An extended operation allows clients to make requests and receives responses with predefined syntaxes and semantics that may be specific to particular implementations.

The distributed directory environment includes multiple directory servers 212-216 that interoperate within the same distributed data processing environment as proxy server 206 and client application 204, e.g., in a manner similar to the distributed data processing environments that are shown in FIG. 1A and FIG. 1C. Directory servers 212-216 support functionality for accessing datastores that contain portions of a distributed directory, i.e. portions of a directory information tree, shown as distributed directory datastores 218-222. Directory servers 212-216 also contain functionality, which is not shown in FIG. 2, that supports the receipt and processing of proxied authorization controls, e.g., as may be sent by proxy server 206 or other directory clients. A typical directory server is a relational database management (RDBM) server.

In a manner similar to the scenario that was described further above, user entries, group entries, and target object entries that are of interest to a particular directory operation may reside in different portions of a distributed directory that are supported on different systems. In the example that is shown in FIG. 2: target object entry 224 resides within distributed directory datastore 218; user entry 226 resides within distributed directory datastore 220; and group entry 228 resides within distributed directory datastore 222. These locations are merely representative.

Thus, a distributed directory is a directory environment in which data is partitioned across multiple directory servers. As illustrated in FIG. 2, the distributed directory typically comprises a collection of machines including relational database management (RDBM) servers holding data, and one or more proxy servers managing the topology. A representative proxy server may be an IBM® Tivoli® Directory Server that provides, among other functions, request routing, load balancing, failover, distributed authentication and support for distributed/membership groups and partitioning of containers. As described above, the directory proxy server sits at the front-end of a distributed directory and provides efficient routing of user requests thereby improving performance, and providing a unified directory view to the client. The proxy server also provides data support for groups and ACLs that are not affected by partitioning, and support for partitioning of flat namespaces.

FIG. 3 is a block diagram that depicts a typical distributed directory configuration in more detail in accordance with the illustrative embodiments. Proxy server 302 is configured with connection information to connect to each of the backend directory servers A 304, B 306, and C 308 for which it is proxying. Typically, the connection information comprises of host address, port number, bind distinguished name, credentials and a connection pool size. Each of back-end directory servers A 304, B 306, and C 308 is configured with the distinguished name and credentials that proxy server 302 uses to connect to it. The distinguished name must be a member of the backend directory server's (local) administration group or local administrator. In particular, the distinguished name must have administrative and proxy authorization authority.

Proxy server 302 is also configured with partition information, which determines how the data is distributed between the backend servers.

In this illustrative example, servers A 304, B 305, and C 308 have their data split within a "container" (under some entry in the directory tree). Because proxy server 302 handles the routing of requests to the appropriate servers, no referrals are used. Client applications 310, 312, and 314 need only be aware of proxy server 302. Client applications 310, 312, and 314 never have to authenticate with servers A 304, B 306, and C 308. Data within directory servers A 304, B 306, and C 308 may include user entries, user policy entries, group policy entries, and global policy entries. Since multiple policy definitions may apply to a single user, a set of data comprising policy definitions for the user may be partitioned across the directory servers. For instance, server A 304 is shown to contain a first partition of the entries, server B 306 is shown to contain a second partition of the entries, and server C 308 is shown to contain a third partition of the entries.

As previously mentioned, a password policy comprises a set of rules that controls how passwords are used and administered in a distributed directory environment. These rules enforce various security requirements, e.g., that a user change his or her password periodically, that the user's selected password meets certain requirements for construction, that re-use of an old password is prevented, that entities are locked out after a certain number of failed attempts to use a given password, and so on. Password policy enforcement for a user is performed in several key situations: (1) at bind time, such as when the user requests a simple bind to the proxy server, (2) when a user is added to the system, (3) when a bound user requests to modify the bound user's password, (4) when a bound user requests to modify a different user's password, and (5) during password policy pre and post bind extended operations. A pre-bind extended operation may include checking if an account is locked. A post-bind extended operation may include checking for expired passwords, grace logins, and updating failed/successful bind counters. For example, two extended operations may be implemented in the RDBM backend server; they are a Password Policy Initialize and Verify Bind Extended Operation, and a Password Policy Finalize and Verify Bind Extended Operation. Both extended operations may be enabled or disabled via a setting in an LDAP configuration file, e.g., in the cn=Directory, cn=RDBM Backends, cn=Company Directory, cn=Schemas, cn=Configuration entry. The Password Policy Initialize and Verify Bind Extended Operation accepts a bind distinguished name and is performed when bound as an administrator. Preferably, the extended operation is implemented on an RDBM backend server and simply calls in to the RDBM to the pre-bind password policy code. The extended operation checks to see if the target user's account is locked. Possible return codes include codes for internal server error, the users account is locked, invalid distinguished name or password, requester does not have permission to perform the request, and the like. The Password Policy Finalize and Verify Bind Extended Operation accepts a bind distinguished name and return code and is performed when bound as an administrator. The extended operation is implemented on an RDBM backend server and calls in to the RDBM to the post-bind password policy code. The extended operation checks if a password is expired and if any grace logins are left. The extended operation also updates the success and failure counts/times on the entry. More information on pre and post bind extended operations may be found in U.S. patent application Ser. No. 11/776,292 (at least in page 20, lines 17 to page 24, line 9) entitled "Method and System for Enforcing Password Policy for an External Bind Operation in a Distributed Directory" and filed Jul. 11, 2007, assigned to the same assignee herein, and which is incorporated by reference.

Since data in a distributed directory system is partitioned and stored on different servers in the system, password policy definitions for a user or user group may be partitioned and distributed across the different servers. When the policy data is partitioned across directory backend servers in this manner, a password policy check on a user request cannot be performed at a single directory backend server level. Instead, the proxy server must obtain policy information distributed across the directory backend servers to determine the complete effective password policy for the user, and then enforce that policy. While existing distributed directory systems contain proxy servers which can determine the effective password policy for a user when policy information for a user is stored on a single directory server, there is currently no existing mechanism which allows a proxy server to collect policy information for a user when the policy information is distributed across different directory servers and determine the effective password policy for the user.

The illustrative embodiments provide a mechanism for reducing the overhead associated with distributed password policy enforcement operations using a proxy server by providing a mechanism for enforcing password policy when the policy definitions for a user or user group are partitioned and distributed across different directory servers. To enforce password policy on a user request in a distributed directory environment where a set of policy data is partitioned across directory servers, the illustrative embodiments provide a proxy server which performs two steps: first, the proxy server collects policy entries stored across different directory servers for the user and determines the user's effective password policy in response to a request by the user to access data stored in the directory backend servers; and second, the proxy server communicates the effective password policy to the directory backend servers in the form of an Effective Password Policy Control, so the backend servers can use the collected policy information when enforcing the policy on the user request. The effective password policy for a user is the combination of all policy information applicable to the user (i.e., policy definitions that apply to the individual user, policy definitions that apply to groups of which the user is a member, and the global level policy) stored on the directory backend servers. In determining the effective password policy of a target user, the proxy server collects the policy definitions that apply to the target user. The proxy server also collects all the policy definitions that apply to the groups of which the target user is a member. This process includes collecting all the groups of which the target user is a member and collecting the policy definitions that correspond to those groups. The proxy server also collects the global level policy. These collected policies are then combined to determine the effective password policy for the target user. The Effective Password Policy Control may be provided by the proxy server to the backend directory servers to allow the backend servers to determine, based on the user's effective password policy, if the user-requested operation is allowed.

Since password policy can be configured on a per user, per group, or system-wide (global) level, when it is time to decide which set of password rules a user should adhere, all three policies, if they exist, must be taken into consideration. The following sections describe how and when these rules are determined for a given user in a multiple password policies environment. In this environment, there may be various types of password policies, including individual, group, and global.

Individual Password Policy

According to this feature, every user is allowed to have his or her individual password policy. This feature is implemented with an operational attribute, e.g., pwdIndividualPolicyDN, which points to a password policy entry. In this manner, a user entry is extended to have its own password policy entry. This named reference password policy design provides an efficient way to associate multiple user entries to the same policy entry. By changing the attributes of the password policy entry, an administrator can effectively manage a set of users without modifying any of the user entries.

It is not required that all of the password policy attributes need to be defined in a user's individual or group password policy entry. During password policy evaluation time, a user's individual group and global password policy are searched, preferably in order. If an attribute is not defined in the individual password policy entry, it will be searched in the composite group password policy entry. If the attribute is not found, an attribute in the global password policy entry will be used. In the event the attribute is not defined in the global password policy entry either, then a default value may be assumed.

By assigning a value of cn=noPwdPolicy to attribute pwdIndividualPolicyDN for a password policy extended user entry, an administrator may exempt a user from any password policy enforcement. This is different from not defining the attribute in the entry. If the attribute is not defined, the user's effective password policy is derived from the user's group (if it exists) and the global policy. If the attribute is defined with the special value, however, then the effective password policy is not evaluated at all, and the user is not controlled by any password rules.

Group Password Policy

Preferably, an association between a group object and a password policy entry is supported so that the members of the group can be controlled by a set of special password rules. In one embodiment, an operational attribute (e.g., pwdGroupPolicyDN) points to a password policy entry and can be used in any user group object, such as accessGroup, accessRole, groupOfNames, groupOfUniqueNames, and the like. This approach leverages existing group-related functionalities, such as group membership determination, group referential integrity and the like, but extends the functions to support a group-related password policy.

If the distinguished name of a directory administrator and/or the distinguished name of a local administrator group member are specified as one of the members of a password policy group, preferably the distinguished name is ignored. The password of a directory administrator or a member of an administrator group is governed by the administrator password policy defined in a configuration file. Because a user entry may belong to more than one group, multiple group password policy entries preferably are evaluated before the user's group policy can be determined. In a representative embodiment, attributes in all the group password policy entries are combined to form a union of attributes with the most restrictive attribute values taking precedence. How a user's composite group policy is determined is described below. An administrator may exempt a group's policy from being used in the evaluation of the composite group policy. Thus, if a user belongs to a group to which a cn=noPwdPolicy is assigned, then the user's effective policy will not include any attributes from this group policy. Other group policies as well as the global policy and the individual policy will still be evaluated.

Global Password Policy

Preferably, a global password policy entry is created if it does not exist when the proxy server starts up. Typically, the global password policy entry is created with a pwdpolicy attribute set to false.

Policy Evaluation

When the pwdpolicy attribute is set to true, the effective password policy is evaluated for a user. The evaluation of a user's password policy preferably takes place at the beginning of a connection if the bind user is not a local administrative user. Once the user's effective password policy has been determined, the effective password policy is preferably stored in a local structure for the user and this local copy is used for the life of the entire connection.

Evaluation of a User's Group Password Policy

Because a user entry may belong to more than one group, multiple group password policy entries may be evaluated before the user's group password policy is determined. The following are one or more sample rules that may be used to determine a user's composite group password policy (not all are required):

(i) Attributes in all the group password policy entries are combined to form a union of attributes with the most restrictive attribute values taking precedence;

(ii) If -pwdpolicy is set to false in a password policy entry, all the attributes defined in the entry will not be used to calculate the composite group password policy; if the attribute is not set, it is defaulted to false;

(iii) If -pwdGroupPolicyDN has a value of cn=noPwdPolicy in all of the groups that a user belongs to, no composite group password is evaluated for the user. In this case, unless the user has an individual password policy defined, no policy (not even the global) is applied;

(iv) An attribute defined with a non-default value is more restrictive than if defined with a default value which, in turn, is more restrictive than if it is not defined;

(v) Some password policy attributes may be dependent on each other. Thus, for example, the value of passwordMinAlphaChars is set to less than or equal to the value in pwdMinLength minus the value in passwordMinOtherChars. If one attribute is selected from a policy, then preferably the other two attributes are also selected from the same policy. A preferred order of selection is pwdMinLength, passwordMinOtherChars, and passwordAlphaChars. Thus, in this example, the selection is based on picking a largest value for pwdMinLength. If there are two with the same value for that attribute, then the one with the largest value for passwordMinOtherChars may be selected. Once an attribute is selected, preferably the other two attributes are selected automatically. This all-or-none selection guarantees the validity of the values of a composite group password policy.

Although not meant to be limiting, FIG. 4 is a table that lists the rules among password policy attributes and one illustrative embodiment detailing an order of selection of these attributes.

FIG. 5 is a table describing how the most restrictive attribute values are determined in an illustrative embodiment. As previously mentioned, attributes in all the group password policy entries are combined to form a union of attributes with the most restrictive attribute values taking precedence. For example, the table shows that a valid value for a particular password policy attribute, pwdMinLength, is a value which is greater than or equal to 0. The table indicates that a restrictive value of a pwdMinLength value is greater when the pwdMinLength value is higher. Thus, the highest pwdMinLength value (the most restrictive value) in a particular group policy will take precedence over other lower pwdMinLength values in other group policies when combining the group policies. Likewise, a valid value for pwdLockout is true or false. Since the table indicates that the more restrictive value for pwdLockout is true, the pwdLockout value of true in a group policy will take precedence over a pwdLockout value of false in other group policies when combining the group policies.

FIG. 6 is a table showing examples of how a user's group password policy is determined using the above sample rules. In particular, the first three columns in this table identify representative group policies (for groups X, Y, and Z) and how a composite group password policy results (in the fourth column) from an evaluation of the respective values in the manner described above.

FIG. 7 is a table showing several examples of how effective password policies are determined. In particular, each of the first three columns include respective individual, group, and global password policies, and the fourth column illustrates the effective password policy that results from the evaluation of the individual, group and global policies in the manner described above.

Evaluation of a User's Effective Password Policy

A user's effective password policy is evaluated if -pwdpolicy is set to true in the global password policy entry. Other password policies, such as individual and group policy, may be permitted when global policy is disabled, but these policy rules preferably will have no effect on the user.

The three kinds of password policies (individual, group, and global) preferably are evaluated in this order (if they exist) while evaluating a user's effective password policy. When a password policy attribute is found in any of the password policy entries, preferably the evaluation of that attribute stops and the attribute value is used as part of the user's effective policy. In this implementation, not all attributes have to be defined in a password policy. If a given attribute is not defined in one password policy, then the next password policy in order is searched until the global password policy is evaluated. If the attribute is still absent from the global policy, a default value may be assumed. As a result, preferably the final effective password policy contains all attributes that pertained to a user's password.

The attribute -pwdPolicyStartTime is set to the current system time when -pwdpolicy is turned to true. This can be done even if the global password policy entry is set to false. The -pwdPolicyStartTime values, however, preferably are not used for effective policy evaluation unless the global policy is enabled. Once the global policy is enabled, the value of this attribute preferably is selected from a user's individual, then group, and then the global policy. Because -pwdPolicyStartTime exists in every active password policy, the start time of an individual policy, if it exists, will always override any other policy start time as the start time of the user's effective password policy.

The all-or-none attribute selection rules for selecting attributes, such as pwdMinLength, as described in the above section, preferably are also applied to a user's effective password policy evaluation.

Evaluation of a Group's Effective Password Policy

The effective password policy of a group entry preferably is calculated by merging the group's password policy attributes with those in the global password policy with the group policy attributes taking precedence. This effective policy can be queried by using an extended operation.

Interaction with Other Directory Components

During a bind operation, if the global password policy is enabled, the bind user's individual password policy is searched first. Then, based on the password policy group entries, the bind user's group policy can be determined once the user's group membership has been resolved. Together with the global password policy, the user's effective policy can be determined at this time. This effective policy controls if the bind user can be authenticated. Once the user is authenticated, the effective password policy preferably is stored in a connection structure for later use.

For any operation that is used to add or modify a password attribute including an extended operation, if the updated entry is different than the bind entry, the updated entry's effective password policy is evaluated just like the one for the bind entry, and it is stored in an RDBM request structure; otherwise, the bind entry's effective policy stored in the connection structure will be used. The effective password policy is the policy that determines if the password update operation is allowed.

For a modify operation modifying password attributes, such as resetting a password and unlocking a user account, if the bind user is a password administrator, no effective password policy evaluation will take place for the target user. This means a password administrator can ignore the target user's password policy when modifying password attributes associated with the above two actions. If a password administrator modifies his or her own password, however, the administrative password policy defined in the configuration file is used to make sure the passwords of the administrative users are properly modified.

Figure 8:
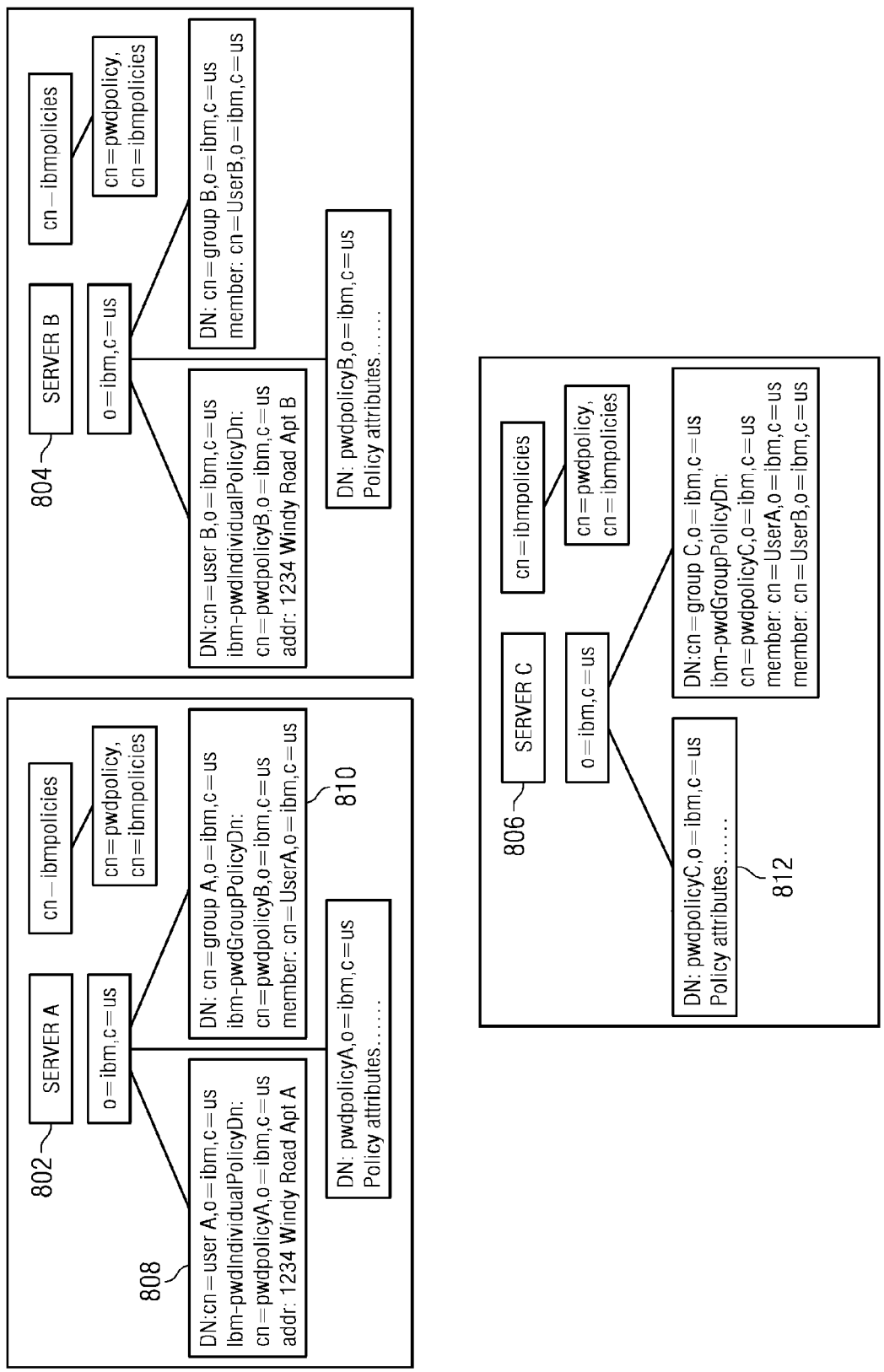
FIG. 8 depicts a block diagram illustrating how directory entries may be partitioned and distributed across backend directory servers in accordance with the illustrative embodiments.

Turning now to FIG. 8, a block diagram is depicted which illustrates how directory entries may be partitioned and distributed across backend directory servers in accordance with the illustrative embodiments. Directory entries in this example include user entries, user policy entries, group entries, group policy entries, and global policy entries. Servers A 802, B 804, and C 806 are representative of servers A 304, B 306, and C 308 in FIG. 3 in more detail. In this example, data under the organization name "IBM" and the country "US" (i.e., o=ibm, c=us) is shown to be split across servers A 802, B 804, and C 806. Data is typically split evenly across the directories by hashing on the relative distinguished name (RDN) of an object. The relative distinguished name is the first component in the distinguished name which identifies the entry distinctly from other entries having the same parent (e.g., "cn=user A" for distinguished name 808, "cn=group A for distinguished name 810, "cn=pwdpolicyC" for distinguished name 812, etc.)

Figure 9:
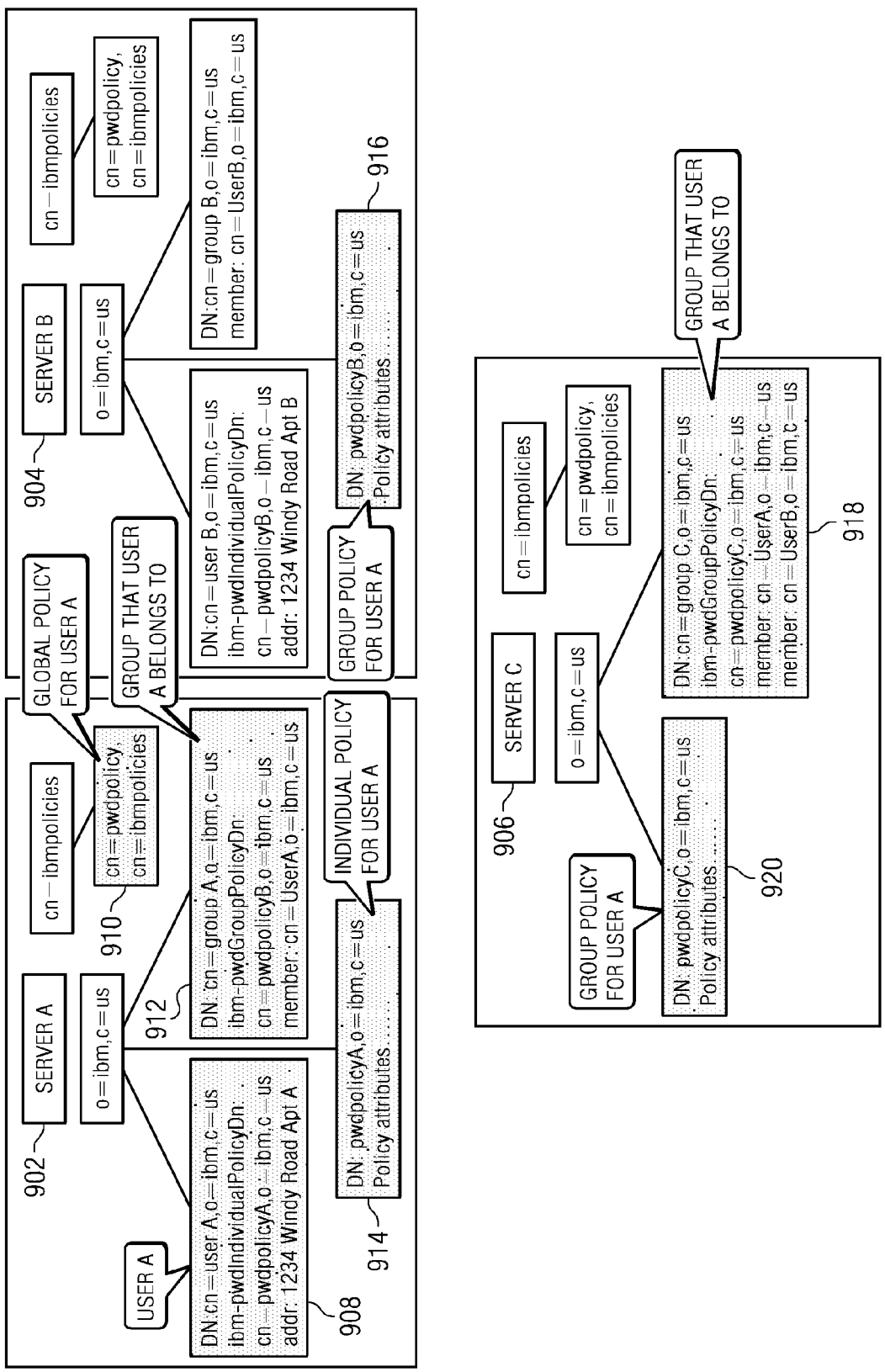
FIG. 9 depicts a block diagram illustrating password policies stored across servers for a particular user in accordance with the illustrative embodiments.

FIG. 9 depicts a block diagram illustrating password policies stored across servers for a particular user in accordance with the illustrative embodiments. In particular, FIG. 9 illustrates how data in a distributed directory environment causes enforcement of password policy for a particular user to be performed across various servers. A backend server in the distributed directory environment (e.g., server A 902) may not be able to locate all the group entries to which a user belongs locally on the server. Without the group entries, information such as the password policy distinguished name of a group cannot be found, and therefore, a user's effective password policy cannot be evaluated. To address this, the proxy server will send to the backend server the effective policy that applies to the user in the format of an LDAP control (e.g., a Group Password Policy Distinguished Name control). In other words, for all requests, the effective password policy control is expected in the request protocol from a proxy server. Based on the received effective policy the backend server is able to enforce the effective password policy for the target user. In the alternative, the group and policy entries reside in each backend servers to ensure the correct evaluation of a user's/group's effective password policy.

In this example, servers A 902, B 904, and C 906 contain user entries, user policy entries, group entries, group policy entries, and global policy entries for users A, B, and C. To obtain complete policy information (i.e., including user, group, and global policy levels) for user A, the proxy server collects all of the policy information applicable to user A stored across servers A 902, B 904, and C 906, since user A's policy information is partitioned across these directory servers. For instance, a search request is used by the proxy server to obtain user A's entry information 908 on directory server A 902. A search request is also used by the proxy server to obtain the individual password policy information about user A. The result is entry 914 from server A. The proxy server then collects the group membership for user A. The proxy server performs a group evaluation extended operation with a new Effective Password Policy control which requests the policy distinguished names associated with the group be returned. The result is the group entries. The extended operation is sent to server A 902, server B 904 and server C 906. The result is group entries 912 and 918, and the policy distinguished names cn=pwdPolicyB, o=ibm, c=us and cn=pwdPolicyC, o=ibm, c=us. The proxy server then searches the directory servers for those policy distinguished names. The resulting entries are 916 and 920. The proxy server then searches the directory servers to obtain the global policy entry. The resulting entry is 910.

Figure 10:
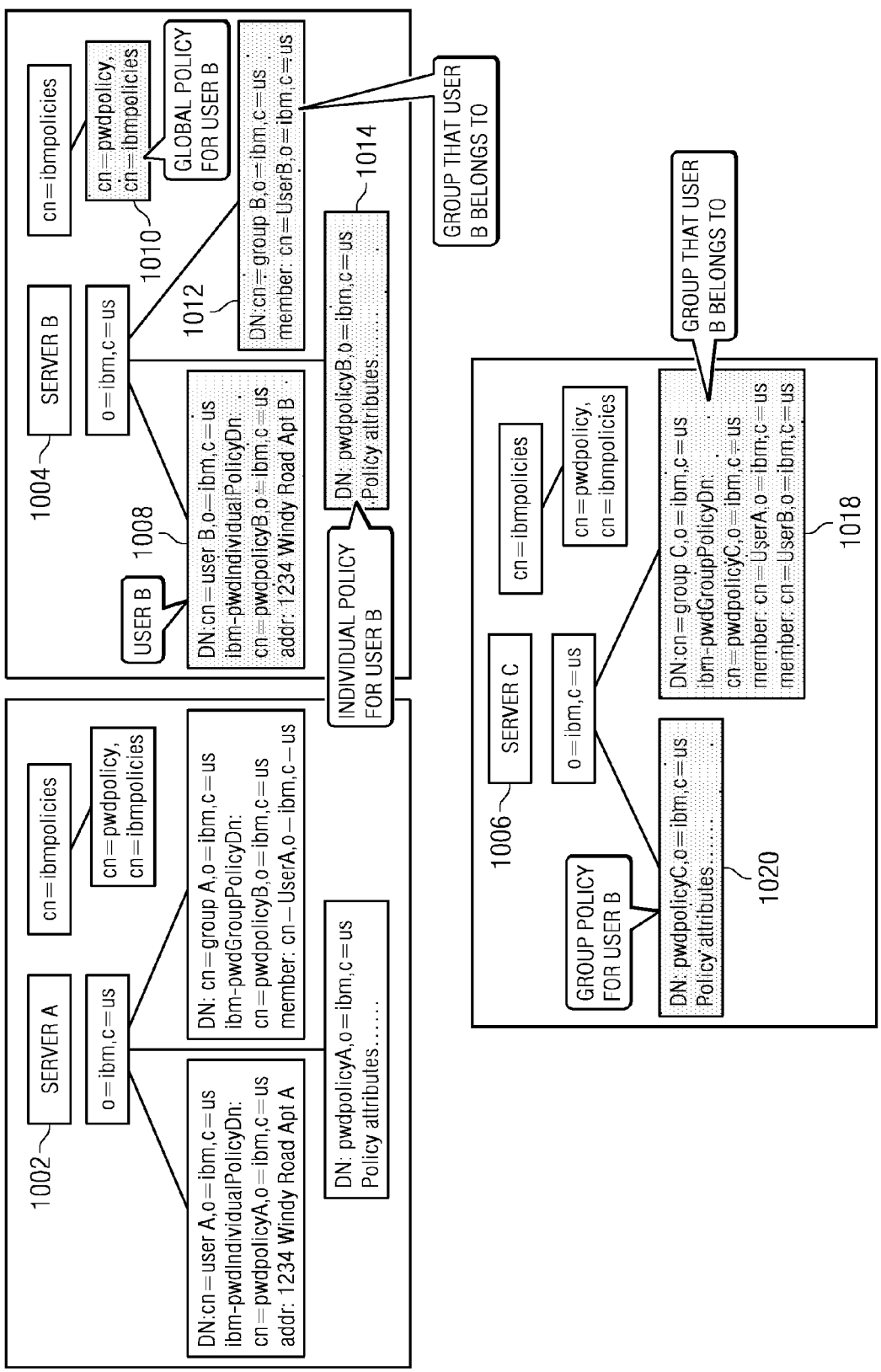
FIG. 10 depicts a block diagram illustrating password policies stored across servers for a particular user in accordance with the illustrative embodiments.

FIG. 10 depicts a block diagram illustrating password policies stored across servers for a particular user in accordance with the illustrative embodiments. In this example, the proxy server collects all of the policy information applicable to user B stored across servers B 1004 and C 1006 since user B's policy information is partitioned across these directory servers. A search request is used by the proxy server to obtain user B's entry information 1008 on directory server B 1004. A search request is also used by the proxy server to obtain the individual password policy information about user B. The result is entry 1014 from server B 1004. The proxy server then collects the group membership for user B. The proxy server performs a group evaluation extended operation with a control requesting the policy distinguished names associated with the group be returned. The result is the group entries. The extended operation is sent to server B 1004 and server C 1006. The result is group entries 1012 and 1018 and the policy distinguished name cn=pwdPolicyC, o=ibm, c=us. The proxy server then searches the directory servers for those policy distinguished names. The resulting entry is 1020. The proxy server then searches the directory servers to obtain the global policy entry. The resulting entry is 1010.

Figure 11:
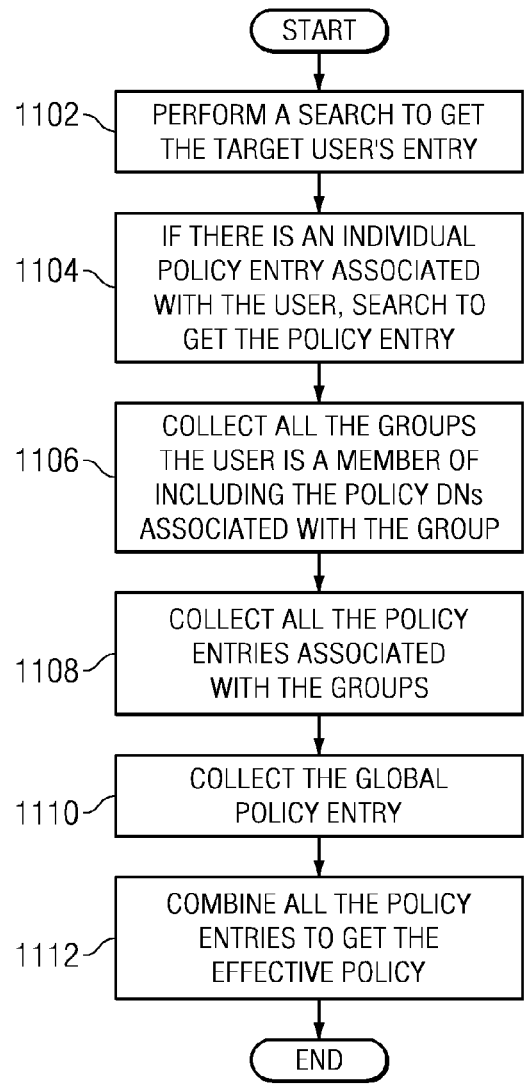
FIG. 11 illustrates a flowchart of a process for collecting and evaluating distributed password policies using a proxy server in accordance with the illustrative embodiments.

FIG. 11 illustrates a flowchart of a process for collecting and evaluating distributed password policies using a proxy server in accordance with the illustrative embodiments. The process described in FIG. 11 may be implemented in a proxy server, such as proxy server 206 in FIG. 2. The process described in FIG. 11 is used to determine the effective password policy of a target user by collecting, using a series of LDAP operations including search operations and extended operations), all of the policy information (e.g., for user, group, and global policy levels) in the distributed directory that is applicable to the user, and combining the collected policies to determine the effective password policy for the user. The three kinds of password policies, individual, group, and global, are preferably evaluated in this order (if they exist) when evaluating a user's effective password policy.

The process begins with the proxy server performing a search of a targeted set of the backend directory servers to obtain the target user's directory entry (step 1102). If there is an individual policy entry associated with the obtained target user's directory entry, the proxy server performs another search to obtain the individual policy entry for the target user (step 1104). Once the individual policy entry is obtained, the proxy server collects the group membership for the target user (step 1106). The group membership comprises all of the groups of which the target user is a member. In collecting the group membership, the proxy server performs a group evaluation extended operation with an Effective Password Policy control requesting the policy distinguished names to obtain the policy distinguished names associated with the groups.

The proxy server then uses the policy distinguished names associated with the groups to search for and collect all of the group policy entries in the targeted directories that are associated with the groups (step 1108). Once the group policy entries are collected, the proxy server searches the targeted directory servers and collects the global policy entry for the target user (step 1110).

After all of the policies entries applicable to the target user are collected from the targeted directory servers, the proxy server combines the policy entries to determine the effective password policy for the target user (step 1112).

In one implementation specific to distributed directories, a proxy server may determine the effective password policy in the following manner. The proxy server first obtains the individual policy entry for the bound user. To obtain the individual policy entry, the proxy server first performs a search in the set of targeted backend directory servers for the user's entry. (If the user's requested operation is a request to add a user, there is no need to search for the entry, since the entry and its attributes are contained in the add request.) One of the attributes returned from the user entry search is the policy attribute ibm-pwdIndividualPolicyDN, which contains the distinguished name of the user's individual policy entry. If no distinguished name value is returned (i.e., no individual policy for the user), the proxy server skips evaluating the individual policy and proceeds to evaluating the group policies as described below. If a distinguished name value is returned from the search, the proxy server performs a search for the individual policy entry based on the distinguished name returned value. The result is a single individual policy entry for the user.

Next, the proxy server obtains policy definitions associated with groups of which the user is a member. To obtain the group policy definitions, the proxy server performs a group evaluation extended operation against each partition. More information about group evaluation extended operations may be found in U.S. Patent Publication No. 20060235850 (at least in paragraphs 0052 and 0065) entitled "Method and System for Access Authorization Involving Group Membership Across a Distributed Directory" and filed Apr. 14, 2005, assigned to the same assignee herein, and which is incorporated by reference. The extended operation requests a backend directory server to evaluate all groups to which a specific user belongs based on the user entry in the backend server. The user entry in the extended operation is the user entry which was previously obtained from the individual policy evaluation. The proxy server sends the extended operation and a new control, Return Policy Distinguished Names Control, to the backend directory servers. This new Return Policy Distinguished Names Control makes a backend server return the policy distinguished names associated with each group distinguished name that the backend server is returning.

Each backend server returns a list of groups and policy distinguished names based on the Return Policy Distinguished Names Control request. If no list is received from any backend server, the proxy server skips evaluating the group policies and proceeds to evaluating the global policy as described below. If one or more lists are received, the proxy server combines all the policy distinguished names from each server into a single list, and removes duplicate policy distinguished names. The proxy server then performs a search for the group policy entries that correspond to the policy distinguished names returned using the Return Policy Distinguished Names Control request. The result is a list of group policy entries for the user.

Next, the proxy server obtains the global password policy definition for the bound user. To obtain the global password policy definition, the proxy server performs a search in the backend directory servers for the global policy entry. A global policy entry in this example is cn=pwdpolicy, cn=ibmpolicies. The actual distinguished name for the global policy entry is implementation specific. The result is a single global policy entry.

Once the individual, group, and global policies (if they exist) have been obtained, the proxy server determines the effective password policy. If no individual policy and group policies have been obtained, the proxy server determines the effective password policy to be the global policy. However, if individual policy and group policies have been obtained, there are two ways to determine the effective password policy for a user. In one embodiment, the effective policy can be calculated locally on the proxy server using the effective password policy evaluation algorithms as previously described above. In a second embodiment, the proxy server sends an extended operation to the backend servers containing all the policy definitions that were discovered in individual, group, and global policy evaluations. The extended operation format is as follows:

Individual: <Entry>
Group: <Entry1>, <Entry2>, <Entry3>, . . . .
Global: <Entry>

The result of the extended operation is that the backend server evaluates the effective policy using the effective password policy evaluation algorithms as previously described above.

Figure 12:
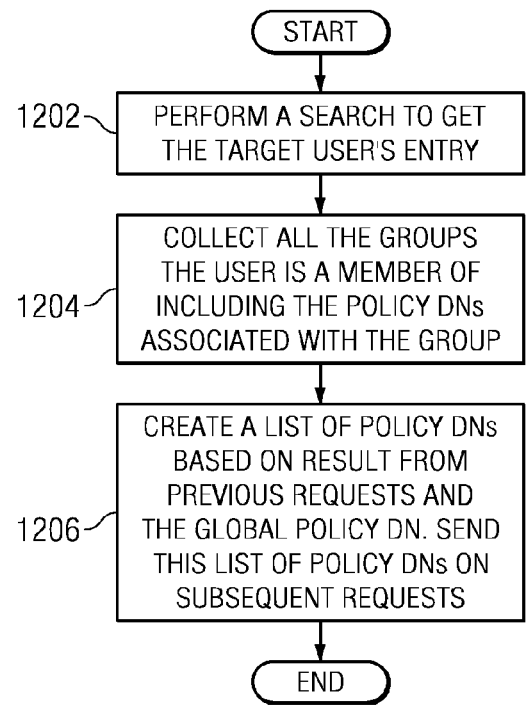
FIG. 12 illustrates a flowchart of a process for collecting and evaluating distributed distinguished names (DNs) using a proxy server in accordance with the illustrative embodiments.

FIG. 12 illustrates a flowchart of a process for collecting and evaluating distributed distinguished names (DNs) using a proxy server in accordance with the illustrative embodiments. In particular, FIG. 12 provides an alternative embodiment in which the policy information is partially distributed across the directory servers. The process described in FIG. 12 may be implemented in a proxy server, such as proxy server 206 in FIG. 2.

In this embodiment, a requirement is made on the system that policy definitions must be stored in the global policy subtree (e.g., cn=ibmpolicies subtree in FIG. 8), and this global policy subtree is replicated across all backend directory servers in the system. Thus, all policy definitions are stored locally on each backend directory server. By replicating all policy definitions in this manner, the proxy server may skip steps of collecting the actual individual, group, or global policies that apply to the target user. Instead, the proxy server only needs to collect the policy distinguished names at the individual, group, and global levels that apply to the target user. These collected policy distinguished names may then be sent to the backend servers on subsequent operations, and each backend directory server looks up the locally stored policies associated with the policy distinguished names to perform the policy evaluation and enforcement.

The process begins with the proxy server performing a search of the backend directory servers to obtain the target user's directory entry (step 1202). Once the user entry is obtained, the proxy server then collects the group membership for the target user (step 1204). The group membership comprises all of the groups of which the target user is a member. In collecting the group membership, the proxy server performs a group evaluation extended operation to obtain the policy distinguished names associated with the groups.

The proxy server then creates a list of policy distinguished names based on the results obtained from the previous individual entry and group entry searches and the global policy distinguished name, and sends the list to the backend directory servers (step 1206). This list of policy distinguished names may be sent to the backend directory servers by the proxy server on subsequent requests from the target user.

Figure 13:
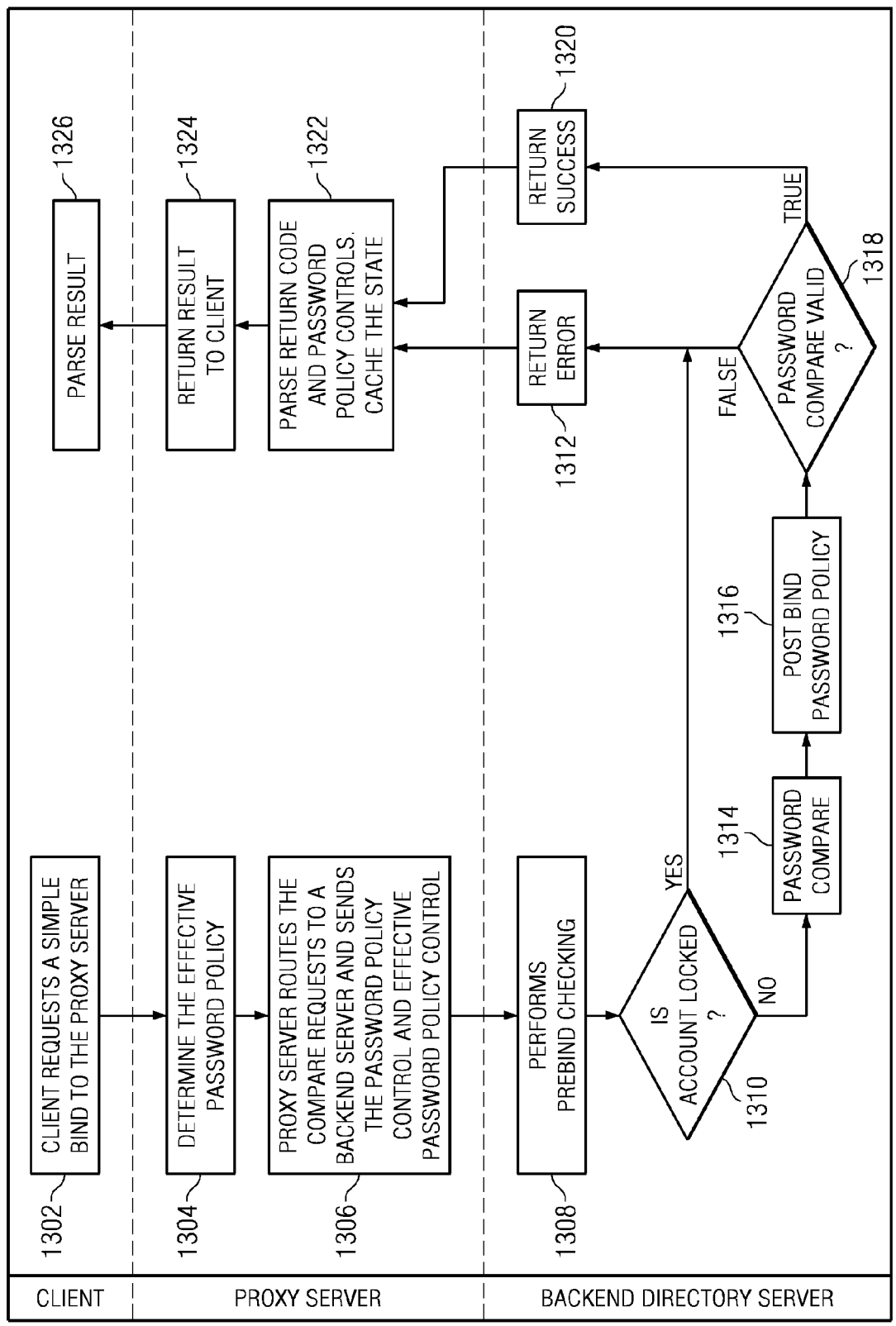
FIG. 13 illustrates a flowchart of a process for password policy enforcement on a simple bind connection in a distributed directory when password policies are distributed in accordance with the illustrative embodiments.

FIG. 13 illustrates a flowchart of a process for password policy enforcement on a simple bind connection in a distributed directory when password policies are distributed in accordance with the illustrative embodiments. A simple bind is an LDAP connection where an LDAP client provides a bind distinguished name and a bind password to the LDAP server for authentication.

The process begins when a client requests a simple bind to the proxy server (step 1302). When the proxy server receives the bind request, the proxy server determines the effective password policy for the target client (step 1304) as described in the process in FIG. 11. The proxy server also performs a compare request on the password supplied from the client to the passwords stored in the password directory. The proxy server then sends the compare request, the Password Policy Control, and the Effective Password Policy Control to a backend directory server (step 1306). The Password Policy Control is the mechanism by which the client tells the server that the client is able to handle extended error/state information related to password policy. The server uses a response control to communicate that state information to the client. The Effective Password Policy Control contains the target user distinguished name and all the attributes and values that make up the effective password policy for the user. The backend servers use this effective policy information to perform a password policy check and enforce password policy on the operation requested by the user.

When the backend directory server receives the Password Policy Control and Effective Password Policy Control on the compare request, the backend directory server performs pre-bind password policy checking (step 1308). This pre-bind password policy checking comprises determining if the user account is locked (step 1310). If so, the backend directory server generates a return error code (step 1312), with the process continuing to step 1322.

If the account is not locked, the backend directory server performs a password compare operation against the password stored at the backend server for the target object (step 1314). The backend directory server then performs post-bind password policy checking (step 1316). This post-bind password policy checking updates local counters related to failed and successful login attempts and checks things like grace logins etc. A determination is then made as to whether the password compare in step 1314 is valid (step 1318). If not, the process continues to step 1312 to generate the return error code to the proxy server. If, however, the password compare is valid (returns 'true'), the backend directory server generates a return success code to the proxy server (step 1320), with the process continuing to step 1322.

At step 1322, the proxy server parses the returned code and the Password Policy Controls and caches the password policy state (e.g., error or success) of the policy check for the target client (step 1322). The Password Policy Controls pass return codes and extended information that the proxy caches. For example, the information in the control may indicate that the account is locked, if the user must change his password, that there are three remaining grace logins, etc. The password policy state is cached to enable the proxy server to access this policy state information for subsequent requests from the bound client. The proxy server then returns the result of the password policy check to the client (step 1324).

When the client receives the result from the proxy server, the client parses the password policy check result (step 1326).

Figure 14:
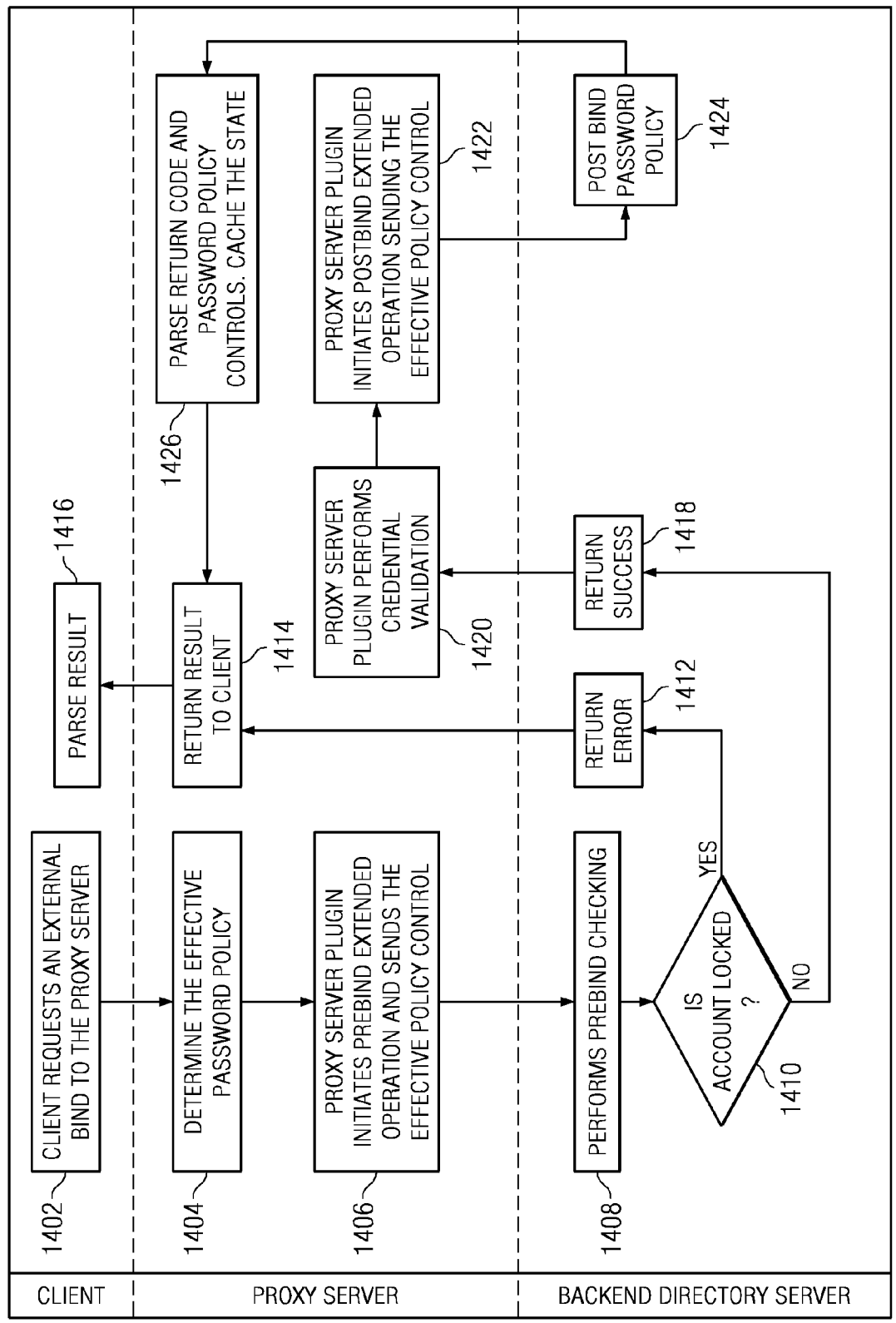
FIG. 14 illustrates a flowchart of a process for password policy enforcement on an external bind connection in a distributed directory when password policies are distributed in accordance with the illustrative embodiments.

FIG. 14 illustrates a flowchart of a process for password policy enforcement on an external bind connection in a distributed directory when password policies are distributed in accordance with the illustrative embodiments. An external bind is a plugin bind that does not employ the straight forward password compare as described in FIG. 13.

The process begins when a client requests a external bind to the proxy server (step 1402). When the proxy server receives the bind request, the proxy server determines the effective password policy for the target client (step 1404) as described in the process in FIG. 11. A proxy server plugin initiates a pre-bind extended operation and sends the Effective Password Policy Control to a backend directory server (step 1406).

When the backend directory server receives the Effective Password Policy Control, the backend directory server performs pre-bind password policy checking (step 1408). This pre-bind password policy checking includes determining if the user account is locked (step 1410). If so, the backend directory server generates a return error code and sends the password policy check error result to the proxy server (step 1412). The proxy server then returns the password policy check error result to the client (step 1414), which parses the password policy check result (step 1416). If the account is not locked at step 1410, the backend directory server generates a return success code to the proxy server (step 1418).

When the proxy server receives the return success code from the backend directory server, the proxy server plugin performs a credential validation (step 1420). The validation of the client's credentials may comprise checking the value of different attributes of the client obtained from the client request. The particular validation performed on the client's credentials by the proxy server are dependent upon the type of bind plugin. The proxy server plugin then initiates a post-bind extended operation and sends the Effective Password Policy Control to the backend directory server (step 1422).

The backend directory server then performs post-bind password policy checking (step 1424). This post-bind processing includes checking for expired passwords, grace logins, and updating failed/successful bind counters.

At step 1426, the proxy server parses the returned code and the Password Policy Controls and caches the password policy state (e.g., account locked, password must change, grace logins, etc.) of the policy check for the target client (step 1426). The password policy state is cached to enable the proxy server to access this policy state information for subsequent requests from the bound client. The proxy server then returns the result of the password policy check to the client (step 1414), which parses the bind result and password policy control. (step 1416).

Figure 15:
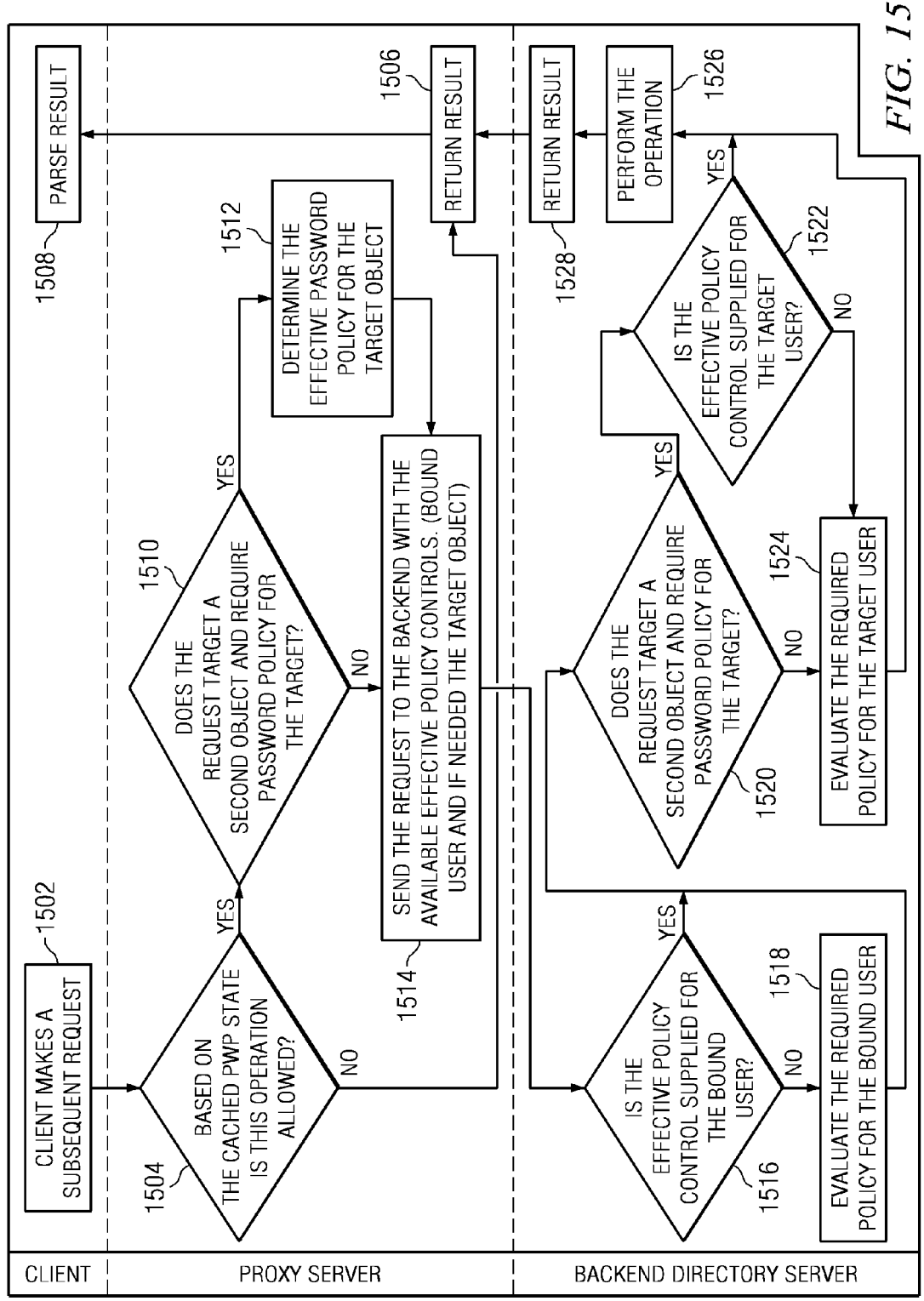
FIG. 15 illustrates a flowchart of a process for password policy enforcement on a bound connection in a distributed directory when password policies are distributed in accordance with the illustrative embodiments.

FIG. 15 illustrates a flowchart of a process for password policy enforcement on a bound connection in a distributed directory when password policies are distributed in accordance with the illustrative embodiments. The process in FIG. 15 occurs subsequent to the bind operations described in FIG. 13 or 14. Typically, only the effective password policy of the bound user is needed to perform the password policy check.

However, in the case of an operation request to add or modify a different user's password, both the bound user's password policy and the target object's password policy are needed by the backend servers for policy enforcement. In this situation, two Effective Password Policy Controls (one for the bound user and one for the target user) are provided by the proxy server to the backend servers. For example, if user A modifies user B's password, the proxy server would have to send the effective policy information for user A in one control, and the effective policy information for user B in second control. The Effective Password Policy Control may be honored only when sent by administrative users to ensure that normal users cannot declare their own password policy.

The process begins when a bound client makes a subsequent request for access to a directory (step 1502). When the proxy server receives the request, the proxy server determines whether the requested operation is allowed based on the cached password policy state (step 1504). If the requested operation is not allowed, the proxy server returns the result to the bound client (step 1506), which parses the returned result (step 1508).

Turning back to step 1504, if the requested operation is allowed, the proxy server makes a determination as to whether the request from the bound client targets a second object and requires a password policy for the target (step 1510). If the request does not target a second object and require a password policy for the target, the process continues to step 1514. However, if the request does target a second object and require a password policy for the target, the proxy server determines the effective password policy for the target object (step 1512). The proxy server then sends the client request to the backend server along with the Effective Password Policy Control for the bound user and, if needed, the target object (step 1514).

When the request is received by the backend directory server, the backend directory server determines if the Effective Password Policy Control has been supplied by the proxy server for the bound user (step 1516). If not, the backend directory server evaluates the required policy for the bound user (step 1518). If the Effective Password Policy Control has been supplied, the backend directory server determines whether the request targets a second object and requires a password policy for the target (step 1520). If the request does not target a second object and require a password policy for the target, the process continues to step 1524.

However, if the request does target a second object and require a password policy for the target, the backend directory server determines if the Effective Password Policy Control has been supplied by the proxy server for the target user (step 1522). If not, the backend directory server evaluates the required policy for the target user (step 1524), and then performs the requested operation (step 1526). If the Effective Password Policy Control has been supplied, the backend directory server performs the requested operation in step 1526. The backend directory server then returns the result of the operation to the proxy server (step 1528). The proxy server returns the operation result to the bound client (step 1506), which parses the returned operation result (step 1508).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The invention can also take the form of a computer program product which has been downloaded over a network from one device to another for use in the other device. For instance, the program code stored in a computer readable storage medium in a server data processing system may be downloaded over a network from the server to a remote data processing system, such as a client or another server. Likewise, the program code stored in a computer readable storage medium in a client data processing system may be downloaded over a network from the client to a remote data processing system, such as a server or another client.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for password policy enforcement in a distributed directory when policy information is distributed, the computer implemented method comprising:

operating a proxy server to establish connections to each of a plurality of backend directory servers;

responsive to providing a request from a client to a given backend directory server, performing a series of lightweight directory access protocol (LDAP) operations on a targeted set of backend directory servers to collect password policy information applicable to a target user, wherein the targeted set of backend directory servers comprises at least a first backend directory server and a second backend directory server, the password policy information applicable to the target user is partitioned and distributed across the targeted set of backend directory servers, and wherein performing the series of LDAP operations to collect password policy information includes collecting a first password policy information portion from the first backend directory server, and collecting a second password policy information portion from the second backend directory server;

responsive to collecting the password policy information applicable to the target user, operating the proxy server to evaluate the collected password policy information to determine an effective password policy for the target user; and sending the request and subsequent requests with the effective password policy from the proxy server to the given backend directory server.

2. The computer implemented method of claim 1, wherein the given backend directory server uses the policy information in the effective password policy to perform a password policy check on the request.

3. The computer implemented method of claim 1, wherein performing the series of lightweight directory access protocol operations on the backend directory servers to collect password policy information applicable to a target user further comprises:

obtaining a distinguished name of an individual directory entry of the target user;

obtaining individual policy entry associated with the distinguished name of the individual directory entry;

obtaining distinguished names of group directory entries associated with the individual directory entry;

obtaining group policy entries associated with the group directory entries; and obtaining the global policy entry associated with the individual directory entry.

4. The computer implemented method of claim 1, wherein a password policy state associated with the effective password policy is cached to enable the proxy server to access the password policy state in response to a subsequent request from the target user.

5. The computer implemented method of claim 1, wherein the password policy information for the target user comprises multiple policies.

6. The computer implemented method of claim 5, wherein the multiple policies comprise individual policy information, group policy information, and global policy information.

7. The computer implemented method of claim 1, wherein responsive to a request to add or modify, selectively, the password of a user different from the target user, the effective password policy for the target user is sent to a backend directory server in the form of a first effective password policy control, and the effective password policy for the different user is sent to a backend directory server in the form of a second effective password policy control.

8. The computer implemented method of claim 1, wherein performing the series of lightweight directory access protocol operations on the backend directory servers to collect password policy information applicable to the target user further comprises:

responsive to a determination that definitions of password polices applicable to the target user are stored locally on each of the backend directory servers, obtaining a distinguished name of an individual directory entry of the target user;

obtaining distinguished names of group directory entries associated with the individual directory entry;

obtaining distinguished name of a global directory entry associated with the individual directory entry; and providing the distinguished names of the individual, group, and global directory entries to the backend directory server, wherein the backend directory server looks up locally stored definitions of password policies associated with the target user password policy evaluation and enforcement.

9. A computer program product stored in a computer readable storage device, executable in a processor for password policy enforcement in a distributed directory when policy information is distributed, the computer readable storage device comprising a storage medium having computer usable program code tangibly embodied thereon, said product comprising:

computer usable program code for operating a proxy server to establish connections to each of a plurality of backend directory servers;

computer usable program code for performing a series of lightweight directory access protocol (LDAP) operations on a targeted set of backend directory servers, responsive to providing a request from a client to a given backend directory server, to collect password policy information applicable to a target user, wherein the targeted set of backend directory servers comprises at least a first backend directory server and a second backend directory server, the password policy information applicable to the target user is partitioned and distributed across the targeted set of backend directory servers and wherein performing the series of LDAP operations to collect password policy information includes collecting a first password policy information portion from the first backend directory server, and collecting a second password policy information portion from the second backend directory server;

computer usable program code for operating the proxy server to evaluate the collected password policy information to determine an effective password policy for the target user, in response to collecting the password policy information applicable to the target user; and computer usable program code for sending the request and subsequent requests with the effective password policy from the proxy server to the given backend directory server.

10. The computer program product of claim 9, wherein the given backend directory server uses the policy information in the effective password policy to perform a password policy check on the request.

11. The computer program product of claim 9, wherein the computer usable program code for performing the series of lightweight directory access protocol operations on the backend directory servers to collect password policy information applicable to a target user further comprises:

computer usable program code for obtaining a distinguished name of an individual directory entry of the target user;

computer usable program code for obtaining individual policy entry associated with the distinguished name of the individual directory entry;

computer usable program code for obtaining distinguished names of group directory entries associated with the individual directory entry;

computer usable program code for obtaining group policy entries associated with the group directory entries; and computer usable program code for obtaining the global policy entry associated with the individual directory entry.

12. The computer program product of claim 9, wherein the password policy information for the target user is evaluated in an individual policy information, group policy information, and global policy information order.

13. The computer program product of claim 9, wherein the computer usable program code for performing the series of lightweight directory access protocol operations on the backend directory servers to collect password policy information applicable to the target user further comprises:

computer usable program code for obtaining a distinguished name of an individual directory entry of the target user in response to a determination that definitions of password polices applicable to the target user are stored locally on each of the backend directory servers;

computer usable program code for obtaining distinguished names of group directory entries associated with the individual directory entry;

computer usable program code for obtaining distinguished name of a global directory entry associated with the individual directory entry; and computer usable program code for providing the distinguished names of the individual, group, and global directory entries to the backend directory server, wherein the backend directory server looks up locally stored definitions of password policies associated with the target user password policy evaluation and enforcement.

14. The computer program product of claim 9, wherein the computer usable program code is stored in a computer readable storage medium in a data processing system, and wherein the computer usable program code is downloaded over a network from a remote data processing system.

15. The computer program product of claim 9, wherein the computer usable program code is stored in a computer readable storage medium in a server data processing system, and wherein the computer usable program code is downloaded over a network from a remote data processing system for use in a computer readable storage medium with the remote system.

16. A data processing system for password policy enforcement in a distributed directory when policy information is distributed, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to operate a proxy server to establish connections to each of a plurality of backend directory servers; perform a series of lightweight directory access protocol (LDAP) operations on a targeted set of backend directory servers while providing a request from a client to a given backend directory server, in order to collect password policy information applicable to a target user, wherein the targeted set of backend directory servers comprises at least a first backend directory server and a second backend directory server, the password policy information applicable to the target user is partitioned and distributed across the targeted set of backend directory servers and wherein performing the series of LDAP operations to collect password policy information includes collecting a first password policy information portion from the first backend directory server, and collecting a second password policy information portion from the second backend directory server; operate the proxy server to evaluate the collected password policy information to determine an effective password policy for the target user, in response to collecting the password policy information for the target user; and send the request and subsequent requests with the effective password policy from the proxy server to the given backend directory server.

17. The data processing system of claim 16, wherein the given backend directory server uses the policy information in the effective password policy to perform a password policy check on the request.

18. The data processing system of claim 16, wherein the computer usable code to perform the series of lightweight directory access protocol operations on the backend directory servers to collect password policy information applicable to a target user further comprises:

computer usable code for obtaining a distinguished name of an individual directory entry of the target user;

computer usable code for obtaining individual policy entry associated with the distinguished name of the individual directory entry;

computer usable code for obtaining distinguished names of group directory entries associated with the individual directory entry;

computer usable code for obtaining group policy entries associated with the group directory entries; and computer usable code for obtaining the global policy entry associated with the individual directory entry.

19. The data processing system of claim 16, wherein the password policy information for the target user comprises multiple policies, and wherein the multiple policies comprise individual policy information, group policy information, and global policy information.

20. The data processing system of claim 16, wherein the computer usable code for performing the series of lightweight directory access protocol operations on the backend directory servers to collect password policy information applicable to the target user further comprises:

computer usable code for obtaining a distinguished name of an individual directory entry of the target user in response to a determination that definitions of password polices applicable to the target user are stored locally on each of the backend directory servers;

computer usable code for obtaining distinguished names of group directory entries associated with the individual directory entry;

computer usable code for obtaining distinguished name of a global directory entry associated with the individual directory entry; and computer usable code for providing the distinguished names of the individual, group, and global directory entries to the backend directory server, wherein the backend directory server looks up locally stored definitions of password policies associated with the target user password policy evaluation and enforcement.

* * * * *